(12) United States Patent
Sugawara

(10) Patent No.: US 6,549,518 B1
(45) Date of Patent: Apr. 15, 2003

(54) POLICING METHOD AND APPARATUS WITH SMALL ACCESS AMOUNT TO CELL DATA TABLE FOR POLICING DETERMINATION

(75) Inventor: Tsugio Sugawara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/212,438

(22) Filed: Dec. 16, 1998

(30) Foreign Application Priority Data

Dec. 25, 1997  (JP) ............................................. 9-358276

(51) Int. Cl.[7] .............................................. G01R 31/08
(52) U.S. Cl. ................................ 370/236.1; 370/236.2; 370/395.2
(58) Field of Search ................................ 370/230, 231, 370/232, 233, 234, 235, 236, 395.1, 397, 398, 399, 395.2, 395.41, 395.64, 395.65, 236.1, 336.2

(56) References Cited

U.S. PATENT DOCUMENTS

| 5,214,357 | A |   | 5/1993  | Dakin et al. ................ 315/248 |
| 5,432,713 | A |   | 7/1995  | Takeo et al. ................ 364/514 |
| 5,519,689 | A | * | 5/1996  | Kim ............................ 370/17 |
| 5,638,360 | A | * | 6/1997  | Sugawara .................... 370/253 |
| 5,898,669 | A | * | 4/1999  | Shimony ..................... 370/232 |
| 5,999,515 | A | * | 12/1999 | Ohashi ........................ 370/235 |
| 6,023,453 | A | * | 2/2000  | Ruutu et al. ................ 370/229 |

FOREIGN PATENT DOCUMENTS

| JP | 5-183569 | 7/1993 |
| JP | 5-183570 | 7/1993 |
| JP | 5-244188 | 9/1993 |
| JP | 5-252191 | 9/1993 |
| JP | 5-252192 | 9/1993 |
| JP | 6-188900 | 7/1994 |
| JP | 6-237264 | 8/1994 |
| JP | 6-311178 | 11/1994 |
| JP | 8-32591  | 2/1996 |
| JP | 8-213987 | 8/1996 |
| JP | 8-331148 | 12/1996 |
| JP | 9-186699 | 7/1997 |

\* cited by examiner

*Primary Examiner*—Alpus H. Hsu
*Assistant Examiner*—Thien D Tran
(74) *Attorney, Agent, or Firm*—Foley & Lardner

(57) ABSTRACT

In a policing apparatus, a cell receiving unit receives cells to temporarily store the received cells and performs a policing violation process to each of the received cells as a reception cell based on a result of policing violation determination to the reception cell. A cell data storing section has a cell data storing table for circularly storing a cell identification data of the reception cell, and a subscriber data storing section has a subscriber data storing table for storing a management data necessary for the policing violation determination, for every cell identification data. A control unit refers to the subscriber data storing table based on the cell identification data of the reception cell each time the reception cell is received to read out the management data, and performs the policing violation determination to the reception cell based on the read out management data and an address pointer value for the reception cell. Also, the control unit outputs the result of the policing violation determination to the cell receiving unit, and stores the cell identification data of the reception cell in the cell data storing table based on the address pointer value.

25 Claims, 20 Drawing Sheets

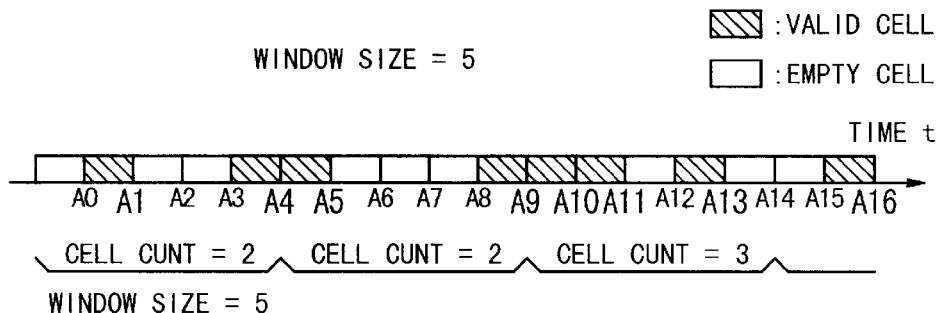
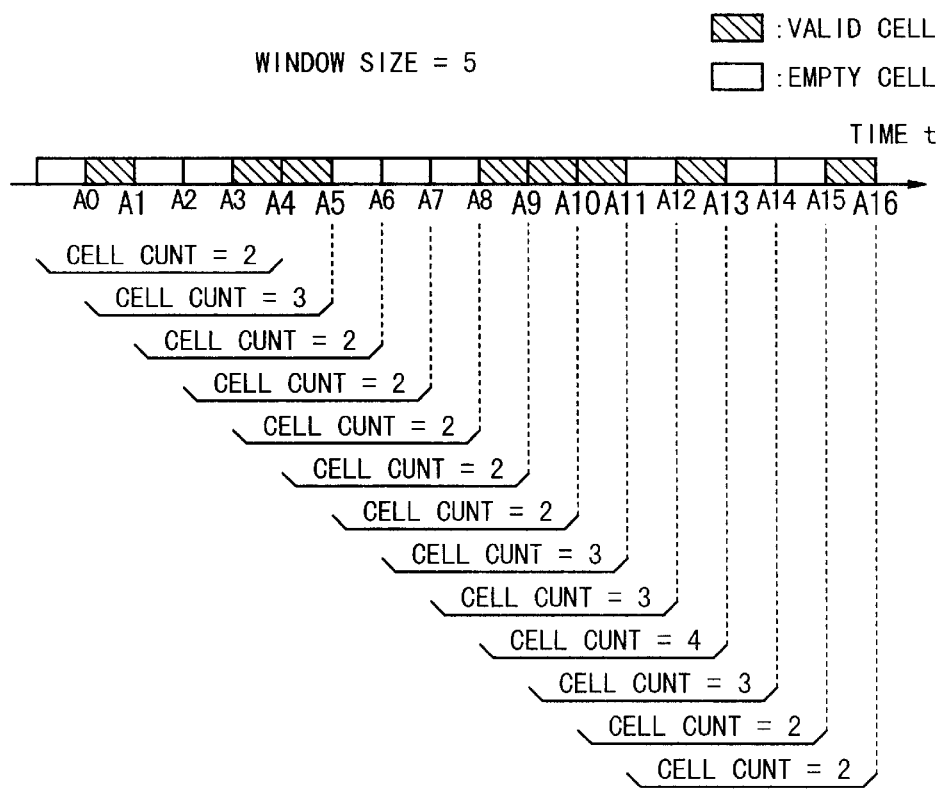

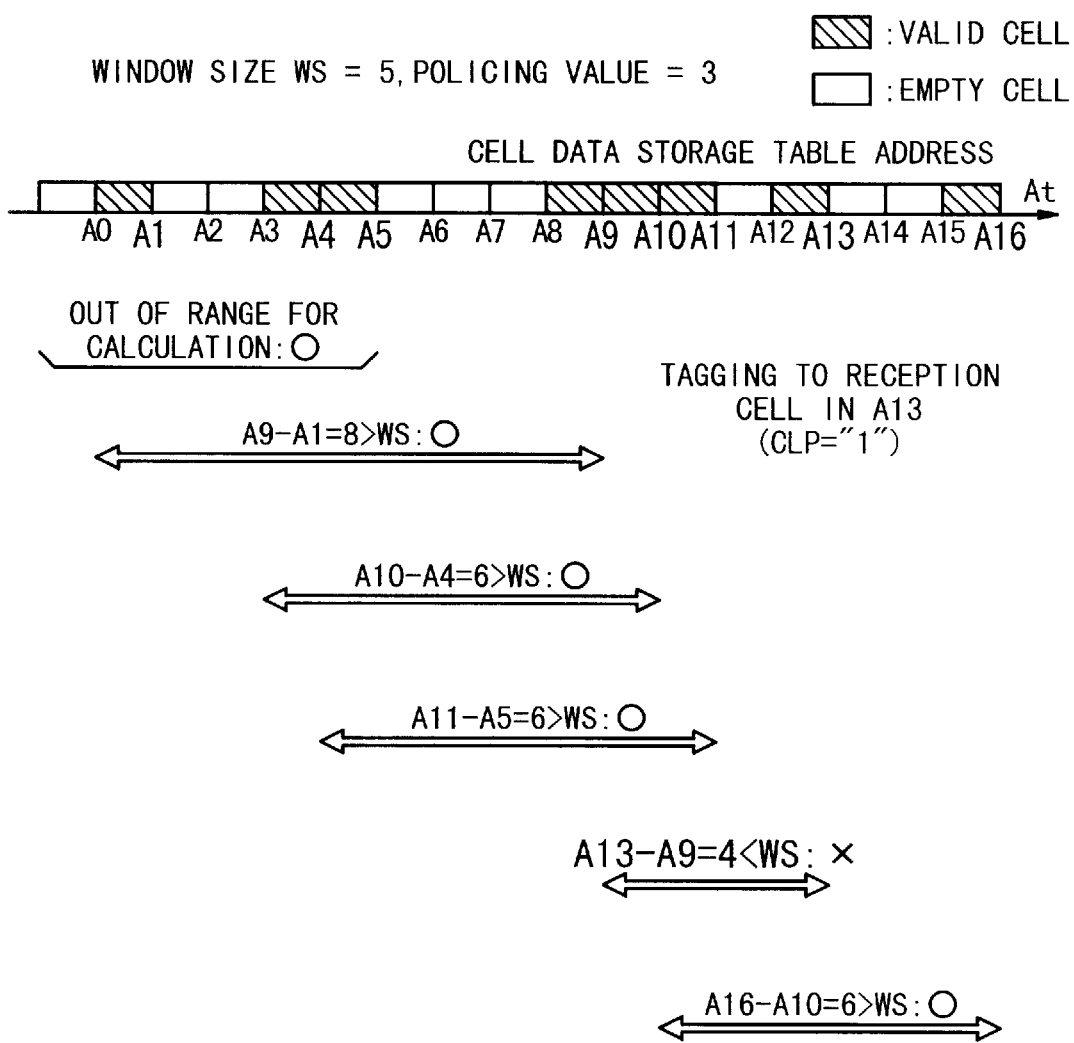

Fig. 19

| | 311 | 312 | 313 | 314 | 315 | 316 |
|---|---|---|---|---|---|---|
| CELL INDENTIFICATION DATA (VPI, VCI) → | WINDOW SIZE (WS) | POLICING VALUE (Cp) | RECEPTION CELL COUNTER VALUE (Cc) | LATEST STORAGE ADDRESS OF CELL DATA STORING TABLE (Ar) | STORAGE ADDRESS OF CELL DATA STORING TABLE BEFORE Cp CELL (Ap) | AVERAGE CELL RATE (Ca) |
| | ------ | ------ | ------ | ------ | ------ | ------ |
| | WINDOW SIZE (WS) | POLICING VALUE (Cp) | RECEPTION CELL COUNTER VALUE (Cc) | LATEST STORAGE ADDRESS OF CELL DATA STORING TABLE (Ar) | STORAGE ADDRESS OF CELL DATA STORING TABLE BEFORE Cp CELL (Ap) | AVERAGE CELL RATE (Ca) |
| | ------ | ------ | ------ | ------ | ------ | ------ |

| WINDOW SIZE 1 (WS1) | WINDOW SIZE 2 (WS2) | POLICING VALUE 1 (Cp1) | POLICING VALUE 2 (Cp2) | RECEPTION CELL COUNTER VALUE 1 (Cc1) | RECEPTION CELL COUNTER VALUE 2 (Cc2) | LATEST STORAGE ADDRESS OF CELL DATA STORING TABLE (Ar) | STORAGE ADDRESS 1 OF CELL DATA TABLE BEFORE STORING Cp CELL (Ap1) | STORAGE ADDRESS 2 OF CELL DATA TABLE BEFORE STORING Cp CELL (Ap2) |
|---|---|---|---|---|---|---|---|---|
| 3111 | 3112 | 3121 | 3122 | 3131 | 3132 | 314 | 3151 | 3152 |
| WINDOW SIZE 1 (WS1) | WINDOW SIZE 2 (WS2) | POLICING VALUE 1 (Cp1) | POLICING VALUE 2 (Cp2) | RECEPTION CELL COUNTER VALUE 1 (Cc1) | RECEPTION CELL COUNTER VALUE 2 (Cc2) | LATEST STORAGE ADDRESS OF CELL DATA STORING TABLE (Ar) | STORAGE ADDRESS 1 OF CELL DATA TABLE BEFORE STORING Cp CELL (Ap1) | STORAGE ADDRESS 2 OF CELL DATA TABLE BEFORE STORING Cp CELL (Ap2) |
| --- | --- | --- | --- | --- | --- | --- | --- | --- |

330

CELL INDENTIFICATION DATA (VPI, VCI)

| WINDOW SIZE 1 (WS1) | WINDOW SIZE 2 (WS2) | POLICING VALUE 1 (Cp1) | POLICING VALUE 2 (Cp2) | RECEPTION CELL COUNTER VALUE 2 (Cc2) | RECEPTION CELL COUNTER VALUE 2 (Cc2) |
|---|---|---|---|---|---|

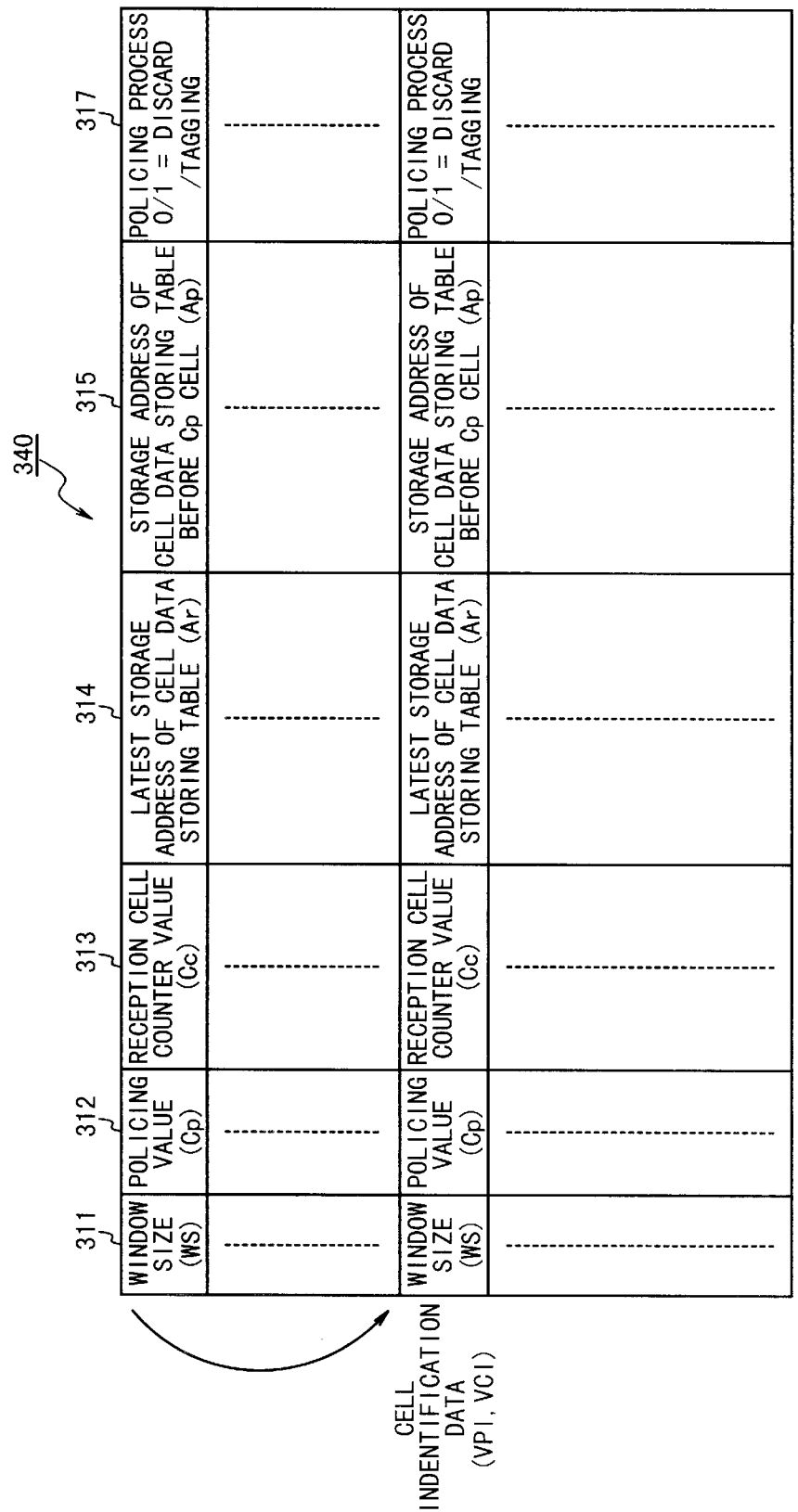

POLICING METHOD AND APPARATUS WITH SMALL ACCESS AMOUNT TO CELL DATA TABLE FOR POLICING DETERMINATION

BACKGROUND OF THE INVENTION

1. Field of the Invention

The present invention relates to a policing apparatus in an ATM (Asynchronous Transfer Mode) network.

2. Description of the Related Art

In an ATM network using an ATM switching apparatus and an ATM local area network (LAN), a communication band which use is predicted is generally declared for every subscriber at the time of the joining contract in the subscriber system in which a subscriber is directly accommodated. The communication band is defined using the values such as a peak transmission rate of ATM cells and an average transmission rate thereof. When communication is started in the subscriber system, the traffic for every subscriber is monitored in accordance with the declaration value for every subscriber. Especially, when the transmission rate of the ATM cells sent out from the subscriber exceeds the declaration value, various processing is accomplished. For example, in a policing process, a part of the ATM cells sent out from the subscriber to exceed the declaration value is discarded. Also, in the tagging process, the priority level of the ATM cells is lowered, and the cell identification data is given to be primarily discarded when traffic jam is caused in the network.

The policing in a user network interface (UNI) as a subscriber interface of the ATM apparatus is also called usage parameter control (UPC). This policing process is the technique, which is necessary to prevent damage from extending to the other general subscriber in the form of cell; loss, when only a specific subscriber sends out ATM cells at the transmission rate more than the declaration value. In addition, the policing process, which is called a network parameter control (NPC), exists in a network node interface (NNI) in the network. This policing process will be explained using the UPC terminology in UNI. Also, various techniques are proposed about the technique, which measures the transmission rate of the specific ATM cells for the policing process.

However, in the conventional policing apparatus of the ATM network which has the conventional transmission rate measurement technique of the ATM cells, the following problems exist. Also, these techniques are not accomplished to the practical use due to various constraints.

The first problem in the conventional example is in the following point. That is, when a policing processing circuit is provided for every cell header identification data, i.e., in units of virtual pass identifier (VPI)/virtual channel identifier (VCI) of the ATM cell, the maximum number of policing processing circuits to be required become a huge value. For example, in case of the ATM cell in UNI, the number of circuits necessary at the maximum structure is 384,000 from the power for the number of bits of $(VPI+VCI)=2^8 \times 2^{16}=256 \times 64$ k=384,000.

When a memory is common to all ATM cells is used and is processed by a common circuit, the number of times of access to the common memory becomes necessary for the number of cell header identifiers. As a result, it has become a huge value. For example, in case of the ATM cells in UNI, it is necessary that access to the common memory is performed 384,000 times per one cell time, about 2.5 $\mu$ second in 155 Mlines at a maximum structure, from the power for the number of bits of $(VPI+VCI)=2^8 \times 2^{16}=256 \times 64$ k =384,000.

By the way, the conventional policing technique is mainly classified into two groups. That is, one is a cell count method which contains a fixed window system, a sliding window system, and a leaky bucket system, and the other is a time comparing method which contains a reception time (time stamp) comparing system, a cell reception interval comparing system.

In the cell count method, the number of reception cells or the difference between the number of reception cells and a predetermined value for a predetermined time interval (window) or continuously is determined. FIG. 1 shows a measurement example of ATM cell transmission rate in the fixed window system of the cell count method. In this example, a window size=5. As seen from the FIG. 1, there is a problem in that the large difference occurs to the cell count value based on an initial position of the window in case of the fixed window system. In this figure, the maximum value would be seen to be the cell count value=3. However, if the initial position is shifted in a front direction, the maximum value could be understood to be the cell count value=4.

Also, the transmission rate measurement is performed at the same time for a lot of ATM cells having different cell identification data (cell headers) in the fixed window system. In this case, it is necessary to perform the resetting operation of a counter and a reading operation of the count value at a time for all the ATM cells. Therefore, it is necessary that a lot of necessary counters for the number of cell identifiers are arranged and operated. Or, it is necessary that a counter is provided for the common memory, and the common memory is frequently accessed for the number of identifiers every time 1 ATM cell is received.

Next, FIG. 2 shows a measurement example of a cell transmission rate in the sliding window system. According to this system, in the sliding window system, a window is slid continuously, compared with the case of the fixed window system. Therefore, it could be understood that the number of ATM cells could be correctly counted without influence due to the initial window position.

However, the transmission rate measurement is performed at the same time for a lot of ATM cells having different cell identification data (cell header). In this time, all windows are made to slide at a time, and the reading operation of the count value for each window must be performed at a time. Therefore, the same problem as the case of the fixed window system is caused. In this way, although the correct measurement is possible, the circuit structure and circuit operation become more complicated. For this reason, this system has a larger problem than the above system.

The leaky bucket system is not especially illustrated. Generally, a counter is used which is incremented by "1" each time an ATM cell is received and decremented by "1" for every predetermined time interval. When the count of the counter is balanced, the transmission rate is equal to a defined or predicted rate. When the reception of the cells continues, the counter is counted up. When the count value exceeds a constant value, it is thought of as the policing violation. In this case, the reception cell is subjected to the cell discarding process or the tagging process.

In case of the leaky bucket system, there is a problem in the following point. That is, a lot of up and down counters must be arranged or a common memory must be frequently accessed, when transmission rate measurement is performed at the same time to a lot of ATM cells having different cell identification data (cell headers), like the case of the fixed window system and the sliding window system. Thus, a fundamental problem as this point is left without being solved.

On the other hand, the time comparing system is an influential method, like the cell count method. A reception time (time stamp) is measured for every cell reception in some way and is stored for every cell. A time until the predetermined number of ATM cells is received is compared with a predetermined time. Or, a cell reception time interval is compared with a predetermined value for every ATM cell to determine the existence or non-existence of the policing violation. FIG. 3 shows a policing example of the ATM cells in the reception time comparing system. In this reception time comparing system, a reception time value of an ATM cell is independently stored in the reception time memory for every cell identifier (cell header). In case of the policing value=3, the reception time of a current ATM cell is compared with the reception time of a cell which has been received before 3 cells to determine the time difference of reception time each time the current ATM cell is received. When the determined time difference is smaller than the window size of a predetermined value, it assumes that the current ATM cell is a policing violation cell. This is because the time difference smaller than the window size means that ATM cells have been already received more than the policing value in the window size time. On contrary, in case of that the time difference is equal to or larger than the window size, the current reception ATM cell is not a policing violation cell, because the reception time interval of the cell which is equal to or larger than the window size. Thus, in case of the reception time comparing system, it is necessary to provide the reception time memory independent for every ATM cell. However, it is the reception time memory that is accessed when an ATM cell corresponding to the reception time memory is received. The other reception time memories are not accessed. Therefore, it becomes theoretically possible for the number of times of access to the memory to be decreased greatly even if the memory becomes large in capacity.

However, one of the problems of the existing reception time comparing system is in that it needs a reception time memory independent for every cell identification data. Another problem is in how a reception time can be correctly known. The count value of the counter is generally used to get a reception. However, there is a problem in how a case where the counter overflows many times because the reception interval is long should be distinguished from another case. On other hand, to overcome this point, use of many sets of counters and complicated flag control is tried. However, the problem is not yet completely solved.

Moreover, in the cell reception interval comparing system, a reception time interval between the cells having the same cell identification data is measured. If the measured cell reception time interval is shorter than a predetermined time interval, the reception cell is determined to be a policing violation cell. Although being not illustrated, this system is superior to the above mentioned reception time comparing method in that it is not necessary for the reception time memory independent for every cell identification data. However, because this system determines based on only the reception time interval, it lacks flexibility to the user traffic.

Also, there is the problem in means for correctly measuring the reception time of a cell, like the cell reception time comparing system. However, it can be used in a range, in which the cell time interval is relatively short, so that the counter does not overflow.

However, in any case, there is a problem in that there are many constraints and the above mentioned systems cannot be easily used.

In addition to the above, a policing circuit is described in Japanese Laid Open Patent Application. (JP-A-Heisei 6-311178). In this reference, there are provided a cell detector 1, a self-running type counter 6, a stamp memory section 5, a parameter memory 3, and a determining section 2. The cell detector 1 detects a user identification information of a reception cell. The counter 6 counts to a predetermined value T0. The stamp memory section 5 stores the reception time of the cell and the value of the counter 6 in correspondence to the identification information. The parameter memory 3 stores a predetermined monitor time and the allowable number of reception cells as a cell reception violation parameter. The determining section 2 determines the existence or non-existence of cell reception violation based on the reception time of the cell, the monitor time and the allowable number of reception cells for every user. The stamp memory section 5 is divided into blocks for every user and circulatively used based on the allowable number of reception cells.

A traffic monitoring apparatus is described in Japanese Laid Open Patent Application (JP-A-Heisei 8-213987). In this reference, there are provided, as declaration parameters, a short-term monitor parameter for monitoring a case that cells are sent out with a highest rate, and a middle-term monitor parameter for monitoring a case that cells are sent out with an average rate. For the middle-term monitor, the leaky bucket method is used based on a value obtained by converting the middle-term monitor parameter by a parameter converting section 21. For the short-term monitor, a sliding window method is used.

An ATM cell rate measuring apparatus is described in Japanese Laid Open Patent Application. (JP-A-Heisei 8-32591). In this reference, a header information of a cell received in a cell reception buffer 100 is converted into a value by a converting section 1, and then stored in a header information storing section 4. At the same time, a write pointer 3 and each of window size registers of a group 6 are added by an adding section 5 to produce a read address. Then, the header information of each cell corresponding to one end of a sliding window from the header information storing section 4. A cell counter corresponding to the cell is decremented by "1" only when the header information of the reception cell is not coincident with each of the read out header information and both are coincident with each other in window size. The cell counter is incremented by "1" only when the header information of the reception cell is not coincident with any one of the read out header information.

An ATM policing apparatus is described in Japanese Laid Open Patent Application (JP-A-Heisei 8-331148). In this reference, a counter for policing is decremented by a first value when cells are received in a desired time interval. The counter for policing is decremented by a second value different from the first value when many cells are received for a short time.

A policing apparatus is described in Japanese Laid Open Patent Application (JP-A-Heisei 9-186699). In this reference, one time period of a reference time counter is set longer than 4 times of a maximum value of summations of a cell time interval and a CDV allowable value. The first and second flags f0i and f1i are provided to be alternatively set for every predetermined time corresponding to the maximum value. In the policing determination upon reception of a cell, the first and second flags f0i and f1i are checked. If both of the first and second flags are set, it is determined to be valid, because there is a sufficient cell time interval. Otherwise, the policing determination is performed in detail, considering a cell time interval Ti, the CDV allowable value τi, and a predicted reception time TATi which has been determined on reception of a previous cell. In this case, the calculation range for the policing determination is within ½ of the time period of the reference time counter. Therefore, the correct policing determination can be performed even if the reference time counter counts into a reverse direction from the maximum value to a negative value beyond "0".

SUMMARY OF THE INVENTION

The present invention is accomplished to solve the above-mentioned problems. Therefore, an object of the present invention is to provide a policing method in which the number of times of access to a cell data storing table used in a policing determining process can be greatly decreased.

Another object of the present invention is to provide a policing apparatus for the above mentioned method.

Still another object of the present invention is to provide a policing apparatus in which the hardware scale used for the cell data storing table can be made small.

In order to achieve an aspect of the present invention, a policing apparatus includes a cell receiving unit for receiving cells to temporarily store the received cells and for performing a policing violation process to each of the received cells as a reception cell based on a result of policing violation determination to the reception cell. A cell data storing section has a cell data storing table for circularly storing a cell identification data of the reception cell, and a subscriber data storing section has a subscriber data storing table for storing a management data necessary for the policing violation determination, for every cell identification data. A control unit refers to the subscriber data storing table based on the cell identification data of the reception cell each time the reception cell is received to read out the management data, and performs the policing violation determination to the reception cell based on the read out management data and an address pointer value for the reception cell. Also, the control unit outputs the result of the policing violation determination to the cell receiving unit, and stores the cell identification data of the reception cell in the cell data storing table based on the address pointer value.

When the subscriber data storing table includes a window size as a part of the management data, the control unit performs the policing violation determination based on a reference cell address, the window size and the address pointer value, the reference cell address indicating an address of the cell data storing table in which the cell identification data of a reference reception cell is stored.

In this case, the control unit may determine that the reception cell is a policing violation cell, when a circulative address difference between the address pointer value and the reference cell address is smaller than the window size. Also, the control unit may determine that the reception cell is a normal cell, when the circulative address difference between the address pointer value and the reference cell address is equal to or larger than the window size.

In such a case, the control unit updates the reference cell address to an address of the cell data storing table in which the cell identification data of a next reception cell to the reference reception cell having the same cell identification data is stored, when the reception cell is the normal cell. The control unit may hold the reference cell address without updating of the reference cell address, when the reception cell is the policing violation cell.

The subscriber data storing table may include the reference cell address in addition to the window size as a part of the management data.

The cell data storing table stores a chain data in addition to the cell identification data to form a chain of the reception cells having the same cell identification data. In this case, the control unit stores as the chain data of an immediately previous reception cell to a current reception cell having the same cell identification data, an address of the cell data storing table in which the cell identification data of the current reception cell is stored, when the current reception cell is received by the cell receiving unit. Also, the control unit selectively updates the reference cell address to an address of the cell data storing table in which the cell identification data of a next reception cell to the reference reception cell having the same cell identification data is stored, using the chain data of the reference reception cell, in accordance with the result of the policing violation determination.

The control unit may determine that the reception cell is a normal cell, without performing the policing violation determination, when a number of reception cells having the same cell identification data is smaller than a policing value.

When the subscriber data storing table may store an average cell rate data indicating a number of reception cells in an average window, the control unit may update the average cell rate data each time the reception cell is received.

Also, when the subscriber data storing table stores a policing violation processing data, the control unit may perform a process designated by the policing violation processing data to the reception cell when the reception cell is determined to be a policing violation cell.

In addition, when the subscriber data storing table stores another management data, the control unit refers to the subscriber data storing table based on the cell identification data of the reception cell each time the reception cell is received to read out the management data and the other management data, performs the policing violation determination to the reception cell based on the management data, the other management data and an address pointer value for the reception cell, outputs the result of the policing violation determination to the cell receiving unit, and stores the cell identification data of the reception cell in the cell data storing table based on the address pointer value.

In order to achieve another aspect of the present invention, a policing method includes the steps of:
  receiving a reception cell to temporarily store;
  referring to a subscriber data storing table based on the cell identification data of the reception cell in response to the reception of the reception cell to read out the management data, a subscriber data storing table storing a management data necessary for a policing violation determination, for every cell identification data;
  performing the policing violation determination to the reception cell based on the read out management data and an address pointer value for the reception cell;
  circulatively storing the cell identification data of the reception cell in a cell data storing table based on the address pointer value; and
  performing a policing violation process to the reception cell based on the result of policing violation determination to the reception cell.

When the subscriber data storing table includes a window size as a part of the management data, the step of performing the policing violation determination includes performing the policing violation determination based on a reference cell address, the window size and the address pointer value, the reference cell address indicating an address of the cell data storing table in which the cell identification data of a reference reception cell is stored.

The step of performing the policing violation determination may include:
  determining that the reception cell is a policing violation cell, when a circulative address difference between the address pointer value and the reference cell address is smaller than the window size; and
  determining that the reception cell is a normal cell, when the circulative address difference between the address pointer value and the reference cell address is equal to or larger than the window size.

In this case, the step of performing the policing violation determination may include:
  updating the reference cell address to an address of the cell data storing table in which the cell identification data of a next reception cell to the reference reception cell having the same cell identification data is stored, when the reception cell is the normal cell; and
  holding the reference cell address without updating of the reference cell address, when the reception cell is the policing violation cell.

The subscriber data storing table may include the reference cell address in addition to the window size as a part of the management data.

Also, the cell data storing table may store a chain data in addition to the cell identification data to form a chain of the reception cells having the same cell identification data.

In this case, the receiving step may include storing as the chain data of an immediately previous reception cell to a current reception cell having the same cell identification data, an address of the cell data storing table in which the cell identification data of the current reception cell is stored, when the current reception cell is received.

The step of performing the policing violation determination may include selectively updating the reference cell address to an address of the cell data storing table in which the cell identification data of a next reception cell to the reference reception cell having the same cell identification data is stored, using the chain data of the reference reception cell, in accordance with the result of the policing violation determination.

Also, the step of performing the policing violation determination may include determining that the reception cell is a normal cell, without performing the policing violation determination, when a number of reception cells having the same cell identification data is smaller than a policing value.

Also, when the subscriber data storing table stores an average cell rate data indicating a number of reception cells in an average window, the policing method further includes the step of updating the average cell rate data each time the reception cell is received.

In addition, when the subscriber data storing table stores a policing violation processing data, the policing method may further include updating includes performing a process designated by the policing violation processing data to the reception cell when the reception cell is determined to be a policing violation cell.

When the subscriber data storing table stores another management data, the step of performing a policing violation determination may include:
  referring to the subscriber data storing table based on the cell identification data of the reception cell each time the reception cell is received to read out the management data and the other management data; and
  performing the policing violation determination to the reception cell based on the management data, the other management data and an address pointer value for the reception cell.

BRIEF DESCRIPTION OF THE DRAWINGS

FIG. 1 is a diagram illustrating a method of measuring a cell rate in a conventional fixed window system;

FIG. 2 is a diagram illustrating a method of measuring a cell rate in a conventional sliding window system;

FIG. 18 is a diagram a further different policing determining process in the first embodiment of the present invention;

FIG. 19 is a diagram illustrating the subscriber data storing table of a second embodiment of the present invention;

FIG. 20 is a diagram illustrating the subscriber data storing table of a third embodiment of the present invention;

FIG. 22 is a diagram illustrating the subscriber data storing table of a fourth embodiment of the present invention.

DESCRIPTION OF THE PREFERRED EMBODIMENTS

A policing apparatus of the present invention will be described below in detail with reference to the attached drawings.

Figure 4:
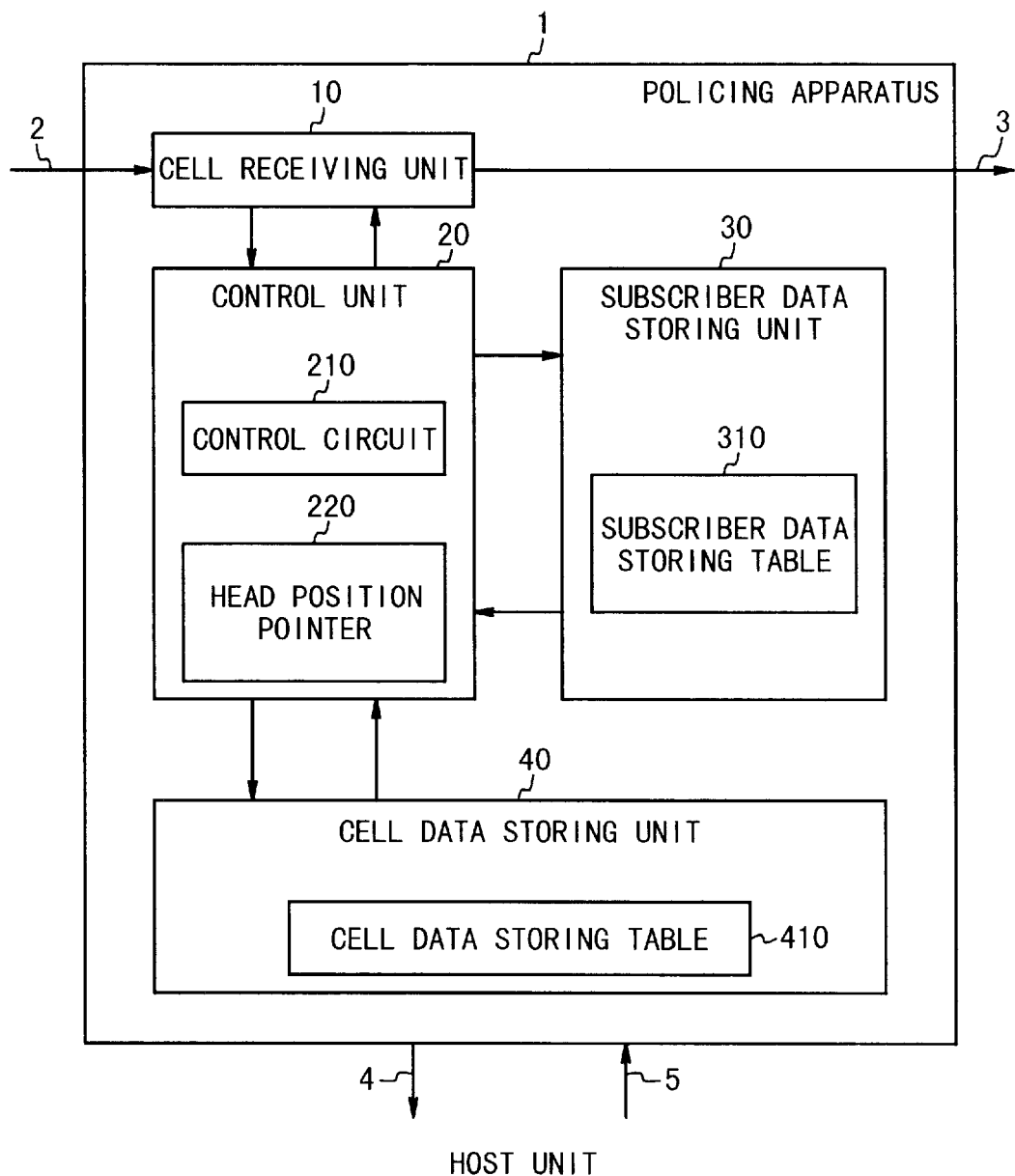
FIG. 4 is a block diagram illustrating the structure of a policing apparatus according to a first embodiment of the present invention.

FIG. 4 is a block diagram illustrating the structure of the policing apparatus according to an embodiment of the present invention.

Referring to FIG. 4, the policing apparatus 1 is composed of a cell receiving unit 10, a the control unit 20, a subscriber data storing unit 30, and a cell data storing unit. The control unit 20 is composed of a control circuit 210 and a head position pointer 220. The subscriber data storing unit 30 includes a subscriber data storing table 310, and the cell data storing unit 40 includes a cell data storing table 410.

Figure 5:
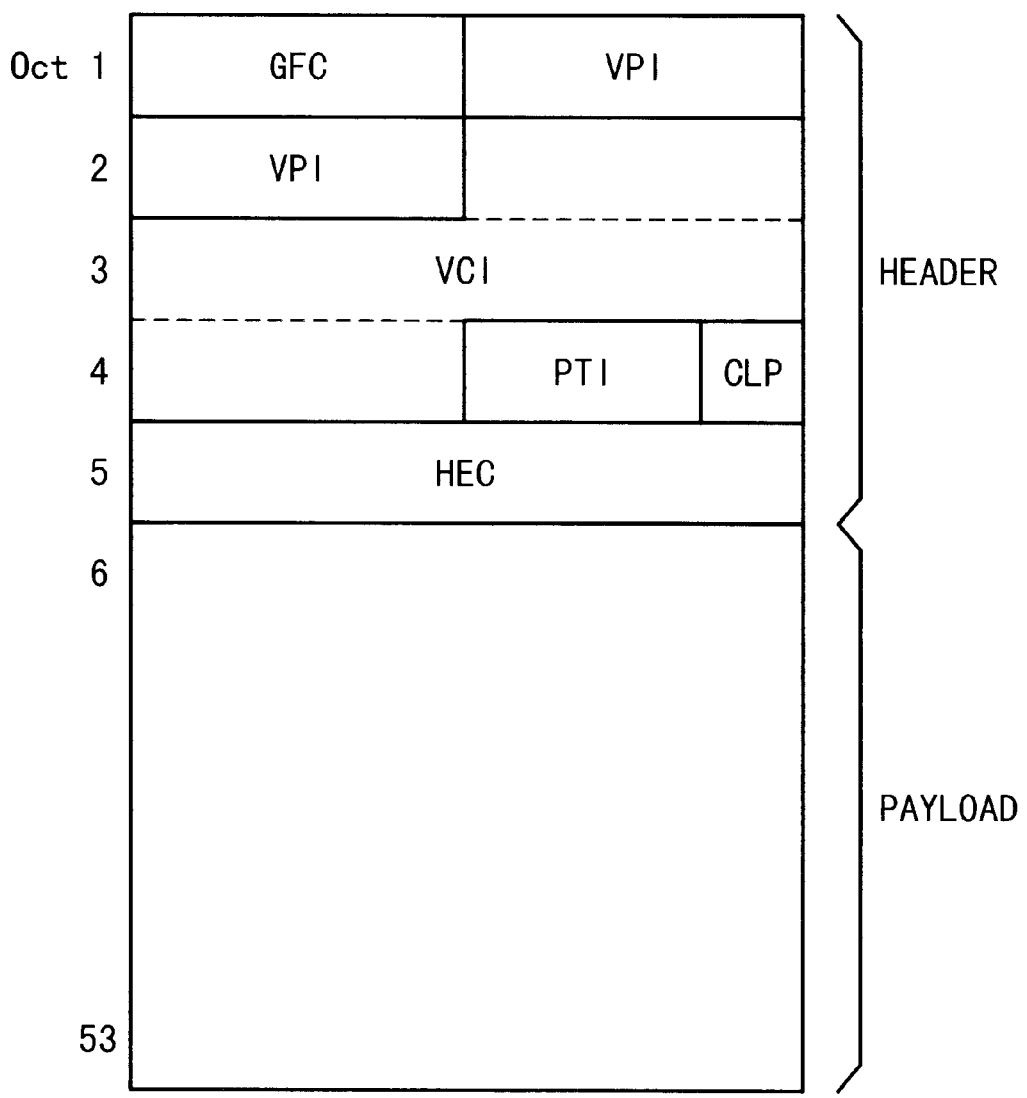
FIG. 5 is a diagram illustrating the format of an ATM cell, which is processed in the present invention.

The policing apparatus 1 receives ATM cells from a cell input line 2. All the ATM cells are supplied with an ATM cell format in the UNI shown in FIG. 5, including any empty cell. The cell receiving unit 10 temporarily stores all the reception ATM cells to process. This cell receiving unit 10 outputs cell identification data VPI and VCI of all the reception ATM cells to the control unit 20. Also, the cell receiving unit 10 outputs the reception ATM cells to a cell output line 3 in accordance with the determining result of existence or non-existence of policing violation by the control unit 20.

The control unit 20 determines the existence or non-existence of the policing violation of the reception cell from the cell identification data VPI and VCI of a reception cell supplied from the cell receiving unit 10. The control circuit 210 refers to the head position pointer 220 and the subscriber data storing table 310 of the subscriber data storing unit 30 which is connected with the control unit 20 to determine the existence or non-existence of the policing violation of the reception cell. The control circuit 210 stores the cell identification data VPI and VCI of the reception cell in the cell data storing table 410 of the cell data storing unit 40 after the determination to updates the stored data. At the same time, the control circuit 210 updates the content of the subscriber data storing table 310 to a new content. The head position pointer value An indicates a write address at the time point to the cell data storing table 410. Every time there is a notice of the cell reception from the cell receiving unit 10, the head position pointer value An is updated by an address amount At corresponding to the 1 cell data of the cell data storing table 410. The update of the head position pointer value An is performed in accordance with to the notice of the cell reception from the cell receiving unit 10. Therefore, the head position pointer value An is automatically updated irrespective of the content of the reception cell.

Figure 6:
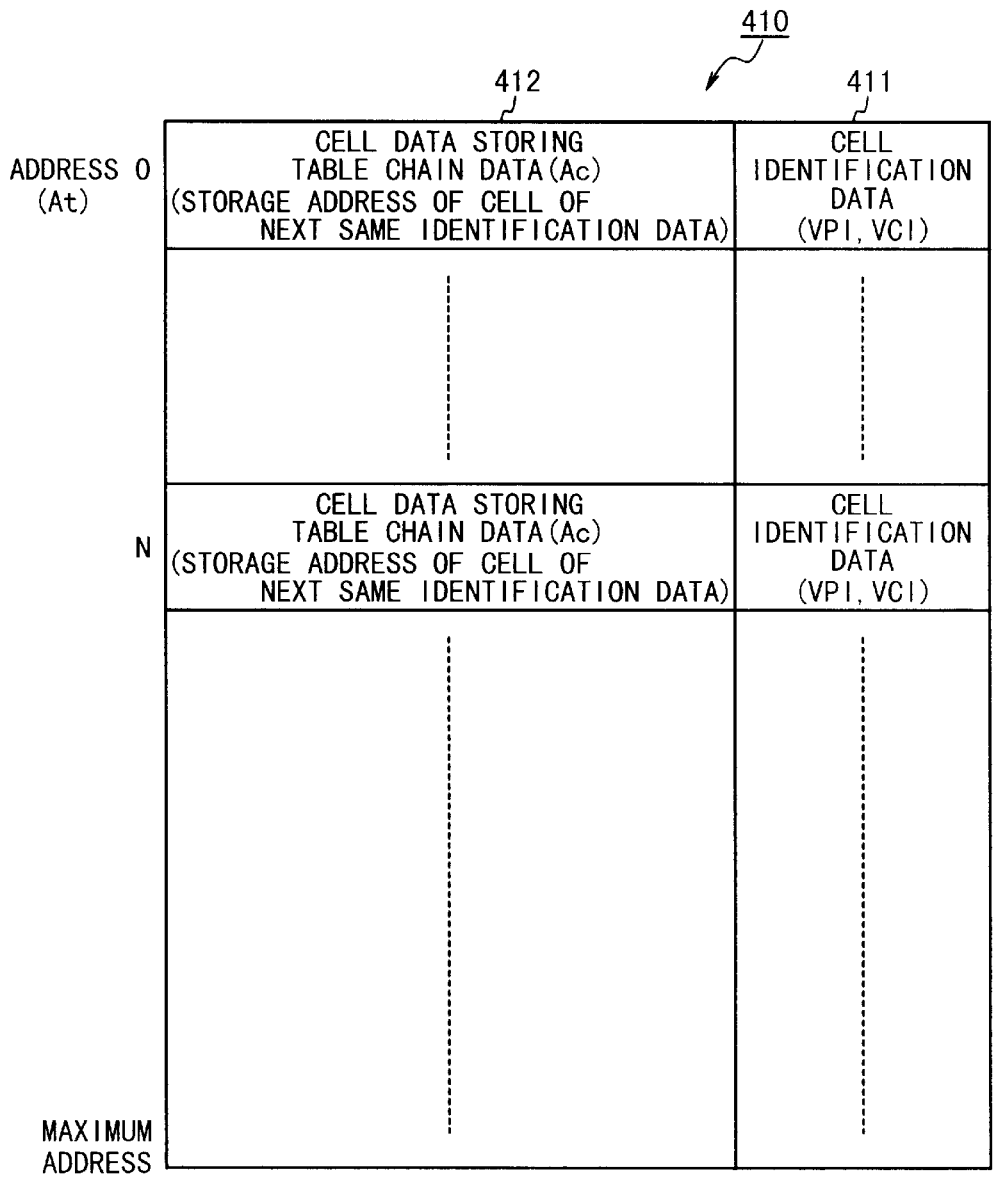
FIG. 6 is a diagram illustrating a cell data storing table shown in FIG. 4.

FIG. 6 shows the structure of the cell data storing table 410. Each of records in the cell data storing table 410 is composed of a pair of the cell identification data VPI and VCI of the reception cell in a storage section 411 and a cell data storing table chain data Ac in a storage section 412. The addresses At from "0" to "the maximum address" are allocated to the respective pairs in units of an address amount corresponding to one ATM cell. The cell identification data VPI and VCI are the cell identification data of the reception cells itself when the head position pointer value An of the head position pointer 220 points out to the address At. When the ATM cells having the same cell identification data VPI and VCI are stored in the cell data storing table 410, the cell data storing table chain data Ac indicates the memory address At of the next ATM cell having the same cell identification data VPI and VCI. Thus, a chain of storage addresses At of the reception ATM cells is produced in units of cell identification data VPI and VCI. The chain of storage addresses At of the reception ATM cells is used in the updating of a storage address Ap to the cell data storing table before a Cp (policing value) cell as a reference address to be described later.

Figure 7:
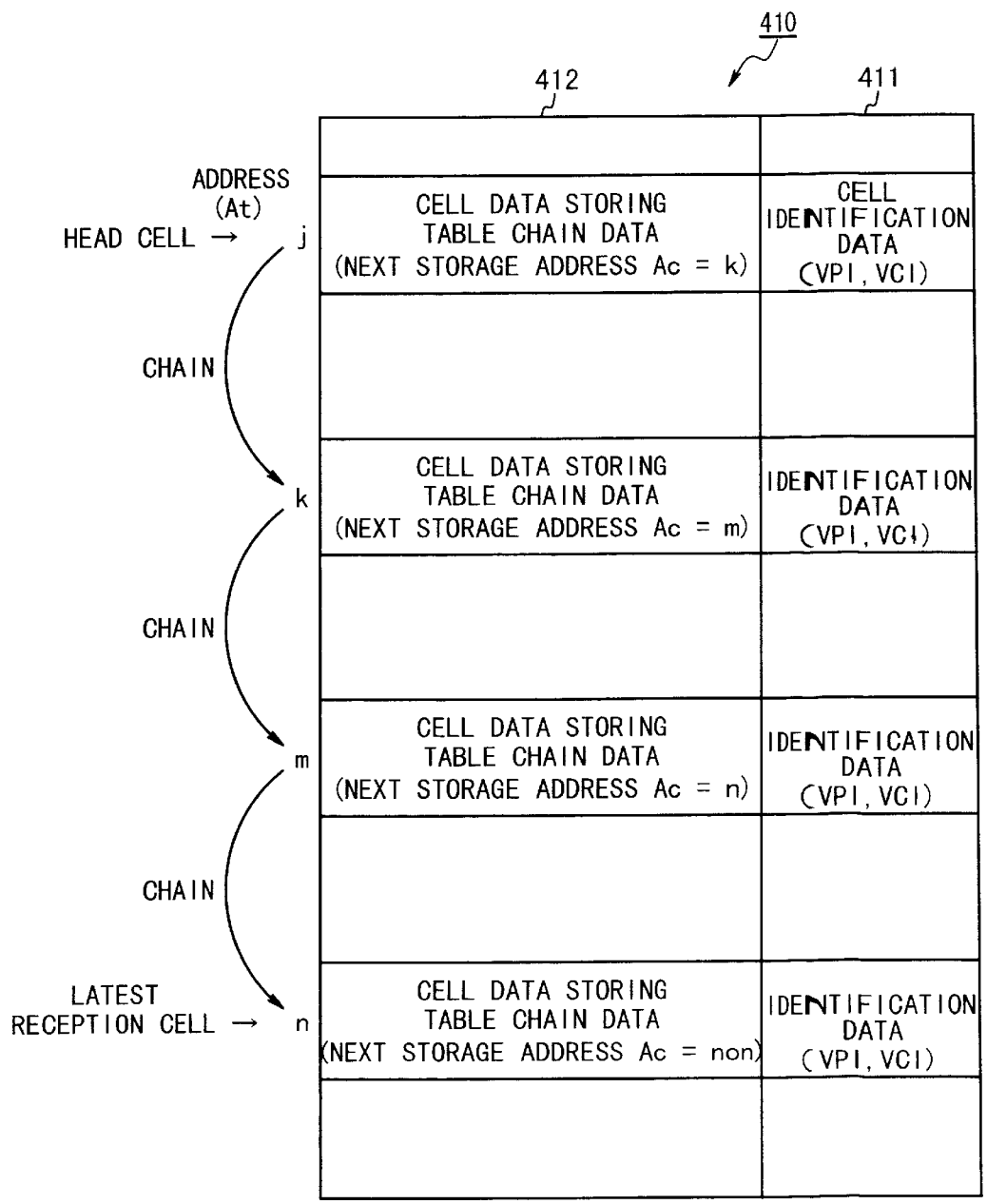
FIG. 7 is a diagram to explain a chain structure of the cell data storing table shown in FIG. 6.

FIG. 7 shows the state of the chain structure of reception ATM cell memory addresses At using the cell data storing table chain data Ac. The cell data storing table chain data Ac always indicates the next memory address At of the cell data storing table 410 in which the ATM cell having,the same cell identification data VPI and VCI. Therefore, the memory address chain is formed which is independent for every specific cell identification data VPI and VCI, as shown in FIG. 7. It should be noted that because the storage address position in which a new ATM cell is stored is uncertain, the latest cell data storing table chain data Ac does no have any address, as show in FIG. 7. Therefore, the latest address At is stored in a storage section 314 of the subscriber data storing table 310 corresponding to the cell identification data VPI and VCI as the latest storage address Ar to the cell data storing table 410 not to be forgotten.

Also, in FIG. 6, a pair of the cell identification data VPI and VCI and the cell data storing table chain data Ac which is stored in the cell data storing table 410 is rewritten and updated at each time of the cell reception contents. Therefore, the pairs are stored in the cell data storing table 410 many time in the circulation. When reaching from "0" to "the maximum address", the address At returns to "0" again. This operation is repeated many times. Thus, the address At of the cell data storing table 410 functions as an endless address. Therefore, the address must be considered from two directions, when the addresses At are compared for the determination of policing violation, as in the present invention.

That is, in the comparison of addresses At, in case of (address "M")−(address "N")≧"0", the value of (address "M")−(address "N") is used as a calculation result. However, in case of (address "M")−(address "N")<"0", (address "M")−(address "N")+"maximum address+1" is calculated again and the calculation result is used as the value of (address "M")−(address "N"). It should be noted that the capacity value of the cell data storing table 410 and the value of the maximum address may have any values if they are larger than a maximum window size value WS which is used for the policing of the ATM cells are received from the cell input line 2 by the policing apparatus 1.

Figure 8:
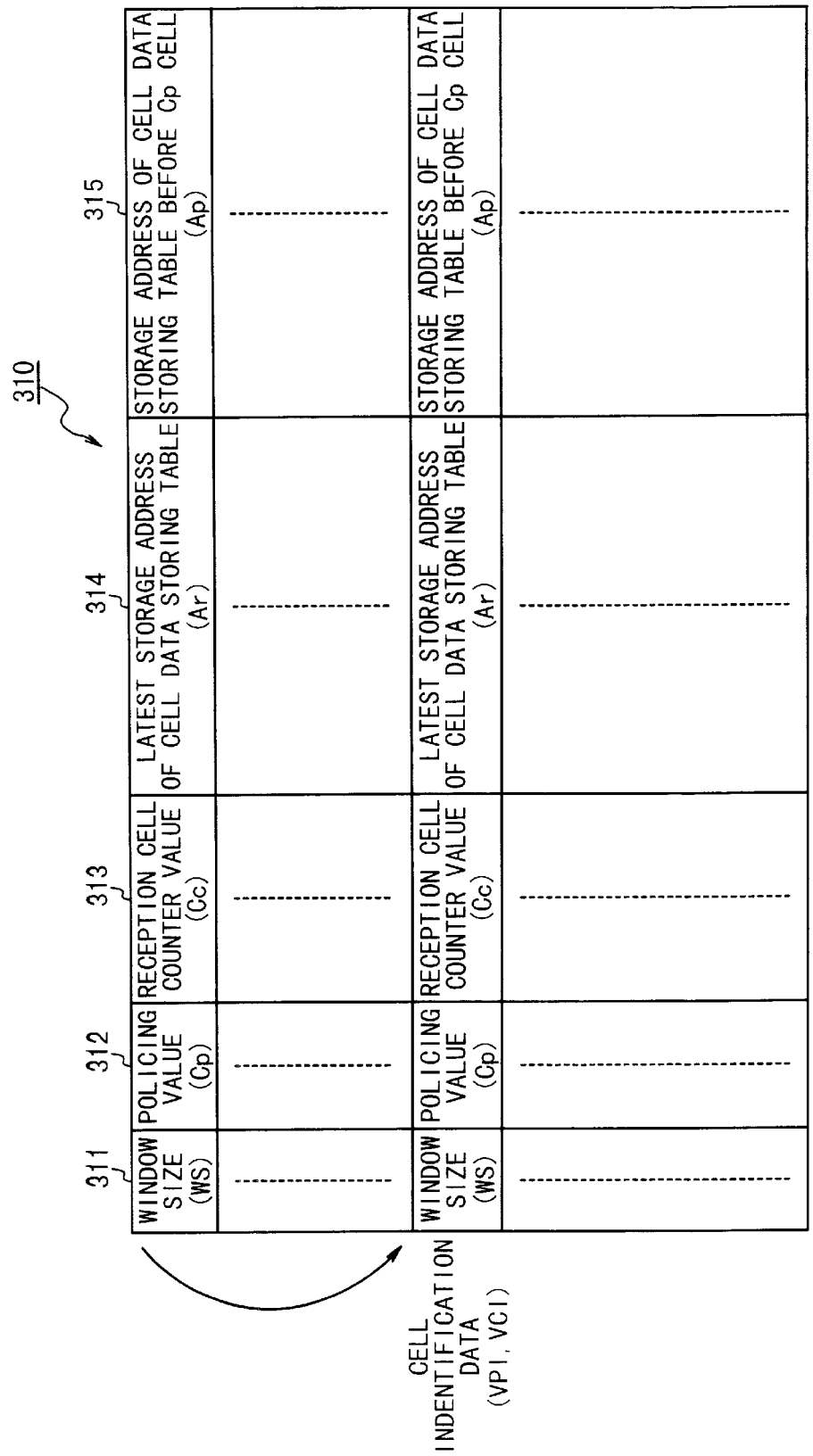
FIG. 8 is a diagram illustrating a subscriber data storing table shown in FIG. 4.

FIG. 8 shows the structure of the subscriber data storing table 310. Referring to FIG. 8, the subscriber data storing table 310 is a management table which is accessed using the cell identification data VPI and VCI) as an address. Thus, records are stored in the subscriber data storing table 310 in units of cell identification data.

Each record includes the window size value WS in a storage section 311, a policing value Cp in a storage section 312, a reception cell counter value Cc in a storage section 313, a latest storage address Ar to the cell data storing table 410 in a storage section 314, and a storage address Ap of the cell data storing table before the Cp cell in a storage section 315 for every cell identification data.

Of the data of each record of the subscriber data storing table 310, the window size WS and the policing value Cp are previously set to have fixed values for cell identification data VPI and VCI. The window size WS and the policing value Cp are not changed on the way of the communication.

The reception cell counter value Cc is a data used to make the policing determination invalid until the number of reception cells reaches the policing value Cp. The initial value of the reception cell counter value Cc is "0", and is incremented by "1" each time an ATM cell is received. However, the maximum value which the reception cell counter value Cc can take is the same as the policing value Cp, and does not exceed the policing value Cp.

As described above, the latest storage address At to the cell data storing table 410 is stored in the storage section 314 of the subscriber data storing tables 310 corresponding to the cell identification data VPI and VCI as the latest storage address Ar not to be forgotten. Therefore, each time a new ATM cell is received, the latest storage address At to the cell data storing table 410 is written in the storage section 314 of the subscriber data storing tables 310.

The storage address Ap of the cell data storing table 410 before the Cp cell is a special address At which is used for the determination of the existence or non-existence of the policing violation. The storage address Ap of the cell data storing table 410 before the Cp cell points out to the storage address At in which the oldest ATM cell is stored among the past reception ATM cells. The past reception ATM cells are cells received earlier than the cell pointed out by the head position pointer value An and a ATM cell which is currently subjected to the policing determination is not contained. The number of the past reception ATM cells is equal to the policing value Cp. The content of the storage address Ap to the cell data storing table before the Cp cell is updated to a new storage address At each time a new ATM cell is received, as in the latest storage address Ar to the cell data storing table. That is, the new storage address At is the storage address obtained by turning back the chain of storage addresses by one chain from the cell data storing table chain data Ac of the record of the cell data storing table, which is pointed out by the storage address Ap to the cell data storing table before the Cp cell.

Figure 9:
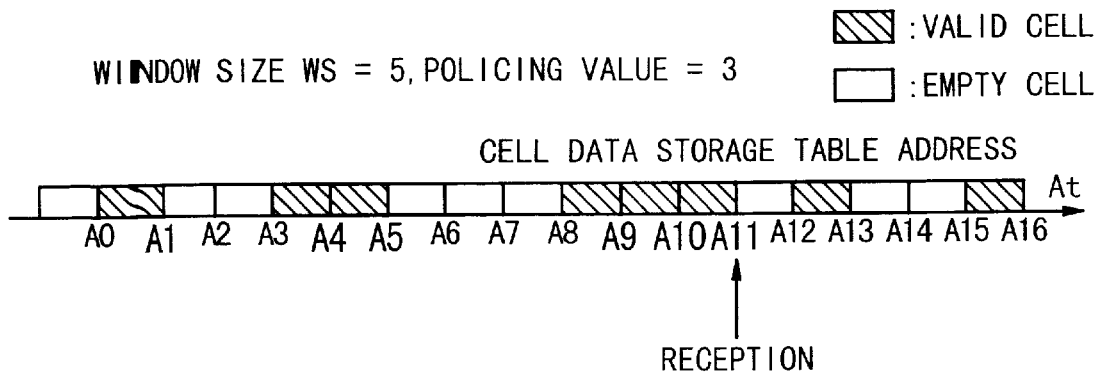
FIG. 9 is a diagram illustrating a table updating process before the policing determining process to a cell in the first embodiment of the present invention.
Figure 10:
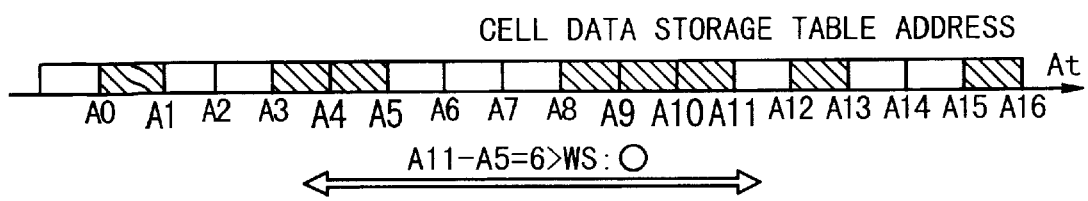
FIG. 10 is a diagram illustrating the policing determining process to the cell in the first embodiment of the present invention.
Figure 11:
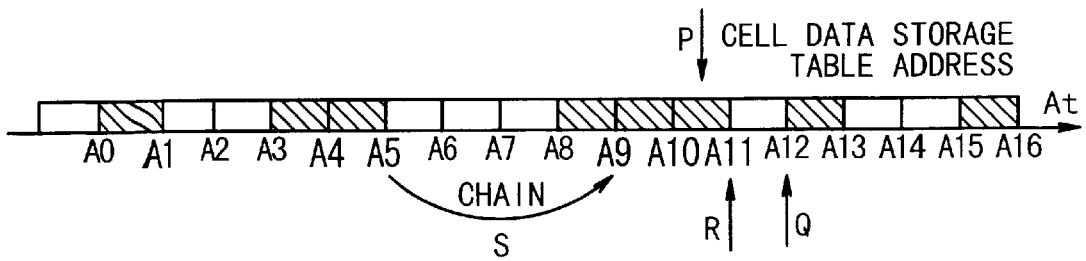
FIG. 11 is a diagram illustrating a table updating process after the policing determining process of the cell in the first embodiment of the present invention.

The policing violation determining operation is performed in accordance with the 3-step processing which are shown in FIGS. 9 to 11.

First, in the table updating process before the policing determination, the cell identification data VPI and VCI and the cell data storing table chain data Ac for the reception cell received in the past is read out as shown in FIG. 9. That is, the cell identification data VPI and VCI and the cell data storing table chain data Ac is stored in the head storage address of the storage address chain from the storage address of the cell data storing table 410 pointed out with the head position pointer value An at present. These data are a past reception cell data which is lost by the circulative storage of a current reception ATM to the cell data storing table 410.

Also, the reception cell counter value Cc and the storage address Ap to the cell data storing table 410 before the Cp cell which correspond to the cell identification data VPI and VCI of the reception cell received in the past are read out from the subscriber data storing table 310. When the reception cell counter value Cc≠0 and the storage address Ap to the cell data storing table 410 before the Cp cell 410=the head position pointer value An, the reception cell counter value Cc is decremented by "1" and stored. Also, the next cell data storing table chain data Ac is read out based on the cell data storing table chain data Ac of the storage address which is pointed out with the head position pointer value An. The next cell data storing table chain data Ac is stored or written as the storage address Ap to the cell data storing table 410 before the Cp cell 410. Thus, the temporal continuity of the cell data storing table 410 can be guaranteed.

For example, it is supposed that the window size WS=5, the policing value Cp=3, and an ATM cell to be stored in the address A11 is received. When the ATM cell is stored, there is a case that an effective storage address Ap to the cell data storing table 410 before the Cp cell is lost. In this case, the reception cell counter Cc and the storage address Ap to the cell data storing table 410 before the Cp cell which are stored in a corresponding position of the subscriber data storing table 310 are updated based on the cell identification data VPI and VCI and the cell data storing table chain data Ac in the reception ATM cell which have been already stored in the storage address of A11.

Also, in the policing determining process of the reception cell shown in FIG. 10, the head position pointer value An, the window size WS and the storage addresses Ap the cell data storing table before the Cp cell are used. In case of An−Ap≧WS, the storage addresses Ap the cell data storing table before the Cp cell is apart from the window size WS, considering the above-mentioned circulative storage. This indicates that the number of reception cells in the window is equal to or less than the policing value. As a result, the policing determination indicates that the reception cell is a normal cell. On the other hand, in case of An−Ap<WS, the storage addresses Ap the cell data storing table before the Cp cell is near to the window size WS, considering the above-mentioned circulative storage. Thus, it determined to be policing violation because the ATM cells are already received for the policing value.

For example, the address A11 is determined from the head position pointer value An of the control unit 20, "A5" is determined from the storage address Ap to the cell data storing table before the Cp cell of the subscriber data storing table 310, and the window size WS is determined from a value stored in the storage section 311.

Further, the updating process after the policing determination shown in FIG. 11 is as follows. That is, if the policing determination is normal, (1) the cell identification data VPI and VCI of the reception cell are stored in the storage address pointed out by the head position pointer value An; (2) the head position pointer value An is stored in the storage address pointed out by the latest storage address Ar to the cell data storing table as the cell data storing table chain data Ac; (3) the head position pointer value An is stored in as the latest storage address Ar to the cell data storing table; and (4) the cell data storing table chain data Ac are traced to update the storage address Ap to the cell data storing table before the Cp cell.

For example, at P of FIG. 11, the cell identification data VPI and VCI of the reception cell are stored in the address A11 of the cell data storing table 410. Also, the storage address A11 is stored as the cell data storing table chain data Ac of an address A10. Also, at Q of FIG. 11, the storage address A12 is stored as the head position pointer value An of the control unit 20. Also, at R of FIG. 11, the address A11 is stored in a corresponding storage position of the subscriber data storing table 310 as the latest storage address Ar to the cell data storing table. Further, at S of FIG. 11, the storage address A9 is stored in a corresponding storage location of the subscriber data storing table 310 as the storage address Ap to the cell data storing table before the Cp cell.

Next, the detail of the operation in the policing determining process will be described.

First, in FIG. 4, the policing apparatus 1 receives ATM cells from the cell input line 2. All the reception ATM cells are supplied to have the ATM cell format of UNI shown in FIG. 5, including empty cells. All the reception ATM cells are received by the cell receiving unit 10, and are temporarily held therein.

The cell receiving unit 10 checks the header error control HEC of the cell header of each of the reception ATM cells. When the header error control HEC indicates to be normal, the cell receiving unit 10 outputs the cell identification data VPI and VCI to the control unit 20. When any HEC error is found, after replacing the reception ATM cell with an empty cell, the cell receiving unit 10 outputs the cell identification data VPI and VCI to the control unit 20.

Also, after the cell identification data VPI and VCI are outputted, the cell receiving unit 10 waits for the processing end of the control unit 20. When the policing determining result from the control unit 20 indicates to be normal, the cell receiving unit 10 outputs the reception ATM cell temporarily held therein to the cell output line 3. When any policing violation is found, the cell receiving unit 10 performs the policing violation processing which has been previously set. In the policing processing method, the reception ATM cell temporarily held therein is discarded. Or, a tagging process is executed. In case of the tagging process, a cell discarding priority CLP bit in the cell header of the reception ATM cell temporarily held is set to "1", the reception ATM cell is outputted to the cell output line 3, in case of this embodiment.

Next, the operation of the cell receiving unit 10 will be described with reference to the flow chart of FIG. 12.

Figure 12:
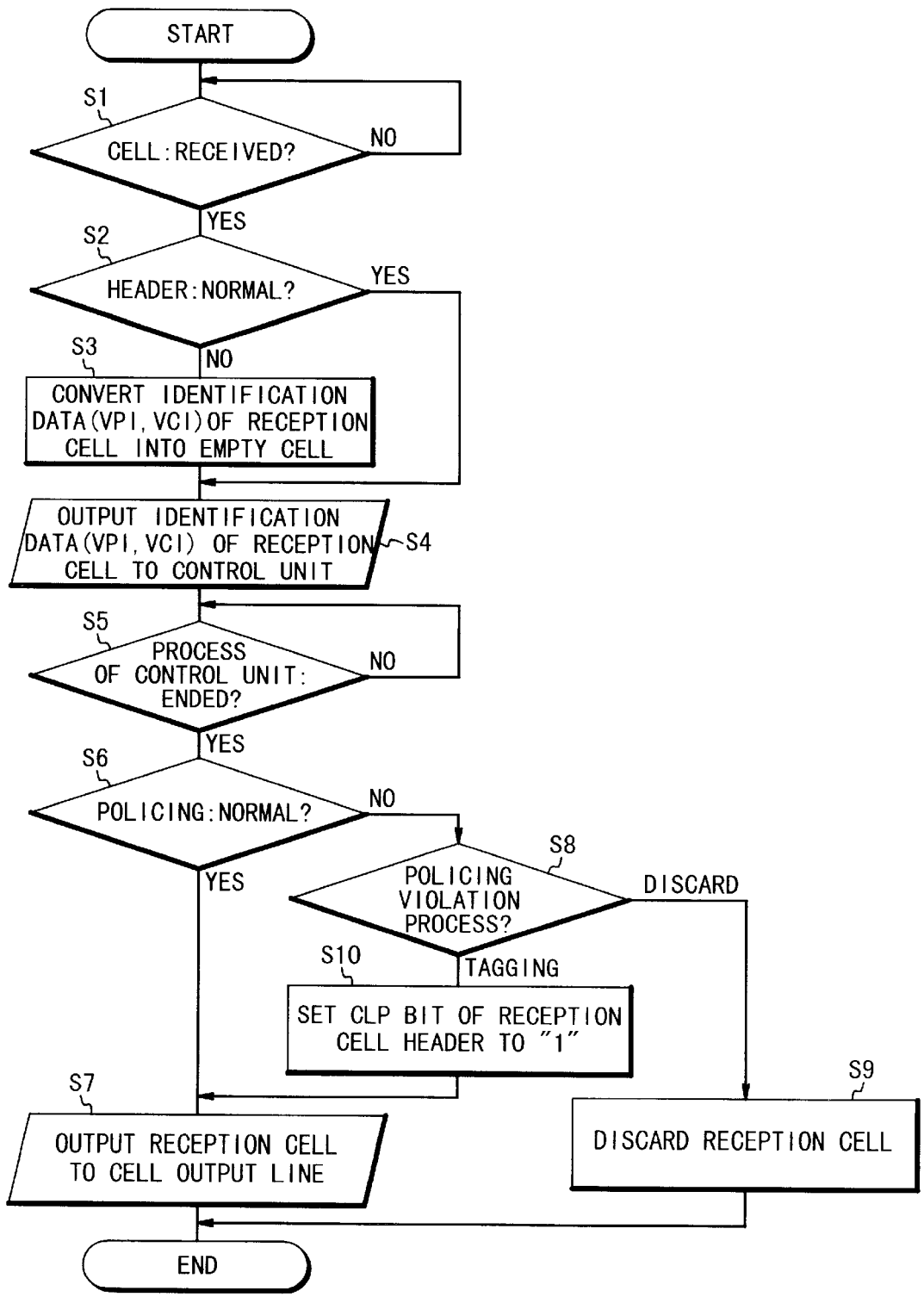
FIG. 12 is a flow chart illustrating an operation procedure of a cell receiving unit shown in FIG. 4.

Referring to FIG. 12, in the first step S1, the cell receiving unit 10 checks the existence or non-existence of reception of each of the ATM cells, including empty cells. The control advances to a step S2 if any ATM cell has been received. If there is no reception of the ATM cell, the control returns to the step S1.

In a step S2, the HEC of the cell header of the reception ATM cell is checked. If this HEC is normal, the control advances to a step S4. In case of the HEC error, the control goes to a step S3. In the step S3, the header of the reception ATM cell having the header error is replaced with the cell identification data VPI and VCI of an empty cell. Then, the control advances to the step S4.

In a step S4, the cell receiving unit 10 outputs the cell identification data VPI and VCI of the reception ATM cell to the control unit 20 and the control goes to step S5.

In the step S5, the control waits for the end of the policing determining process by the control unit 20. When the policing determining process is ended, the control advances to a step S6. When the policing determining process is not ended, the control returns to the step S5.

In the step S6, the result of the policing determining, process is checked. If the result of the policing determining process indicates to be normal, the control advances to a step S7. In a step S7, the reception ATM cell to have kept temporarily is outputted to the cell output line 3. Then, the control ends.

If there is any policing violation, the control advances to a step S8. In the step S8, it is determined which policing violation processing should be performed. As a part of the initial setting of the policing apparatus 1, the policing violation processing is previously set to either one of a cell discarding process and a tagging process. When the cell discarding process is set, the control advances to a step S9. On the other hand, when the tagging process is set, the control advances to a step S10.

In the step S9, the reception ATM cell to have kept temporarily is discarded. Then, the control ends. In the step S10, after a CLP bit in the cell header of the reception ATM cell held temporarily is set to "1", the HEC of the header is calculated again. Then, the control advances to the step S7.

The control ends at the step S7 or the step S9. However, the cell receiving unit 10 repeats the above process one or more times.

Also, the control unit 20 is composed of the control circuit 210 and the head position pointer 220. The control unit 20 refers to the subscriber data storing table 310 and the cell data storing table 410 based on the cell identification data VPI and VCI of the reception ATM cell which is supplied from the cell receiving unit 10, to determine the existence or non-existence of the policing violation of the reception ATM cell.

Also, the control unit 20 updates the tables after the policing determining process.

Next, the operation of the control unit 20, especially, the control circuit 210 will be described below in detail with reference to the flow chart of FIG. 13.

In the first step S11, it is determined whether or not the reception ATM cell is supplied from the cell receiving unit 10. If there is a reception ATM cell, the control advances to a step S100. If there is not input of the reception ATM cell, the returns to the step S11 to wait for the cell reception.

In the step S100, a table updating process is performed before the policing determining process to be described with reference to FIG. 14. As explained above, this processing has very important meaning in the present invention. Through this table updating process, the temporal continuity of the cell data storing table 410 is guaranteed. Also, the reception time difference can be correctly related to the storage address difference.

In a step S12, the cell identification data VPI and VCI of the reception ATM cell are used as a read address for the policing determining process. That is, the window size WS, the policing value Cp, the reception cell counter Cc, the latest storage address Ar to the cell data storing table, and the storage address Ap to the cell data storing table before the Cp cell are read out from the subscriber data storing table 310 for the policing determining process. Then, the control advances to a step S13.

In the step S13, it is determined whether or not the reception ATM cell supplied from the cell receiving unit 10 is a policing object. In case of the window size WS=0, because the reception ATM cell is not the policing object, the control advances to a step S14. Only when the window size WS≠0, the control advances to a step S200 to perform the determination of the policing violation.

In the step S200, the policing violation determining process and the table updating process are, performed by the control circuit 210. These processes will be described with reference to FIG. 15 later. After the step S200, the control ends in FIG. 13. However, the control circuit 210 repeats the above process many times.

In the step S14, the processing of the reception ATM cell out of the policing object is performed. After a notice signal indicating that the reception ATM cell is a normal cell with no policing violation is outputted to the cell receiving unit 10, the control advances to a step S15. In the step S15, because the reception ATM cell is a cell other than the policing object, the cell identification data VPI and VCI of the empty cell are stored in the storage address of the cell data storing table 410 which is pointed out with the head position pointer value An. Then, the control advances to a step S16. In the step S16, the address amount of "1" for 1 cell is added to the address content of the head position pointer value An for the cell data storing table 410. Thus, the head position pointer An itself is updated and then the control ends. In this case, the control ends in FIG. 13, as in the case of step S200. However, the control circuit 210 repeats the above process many times while returning to the beginning of FIG. 13.

Figure 13:
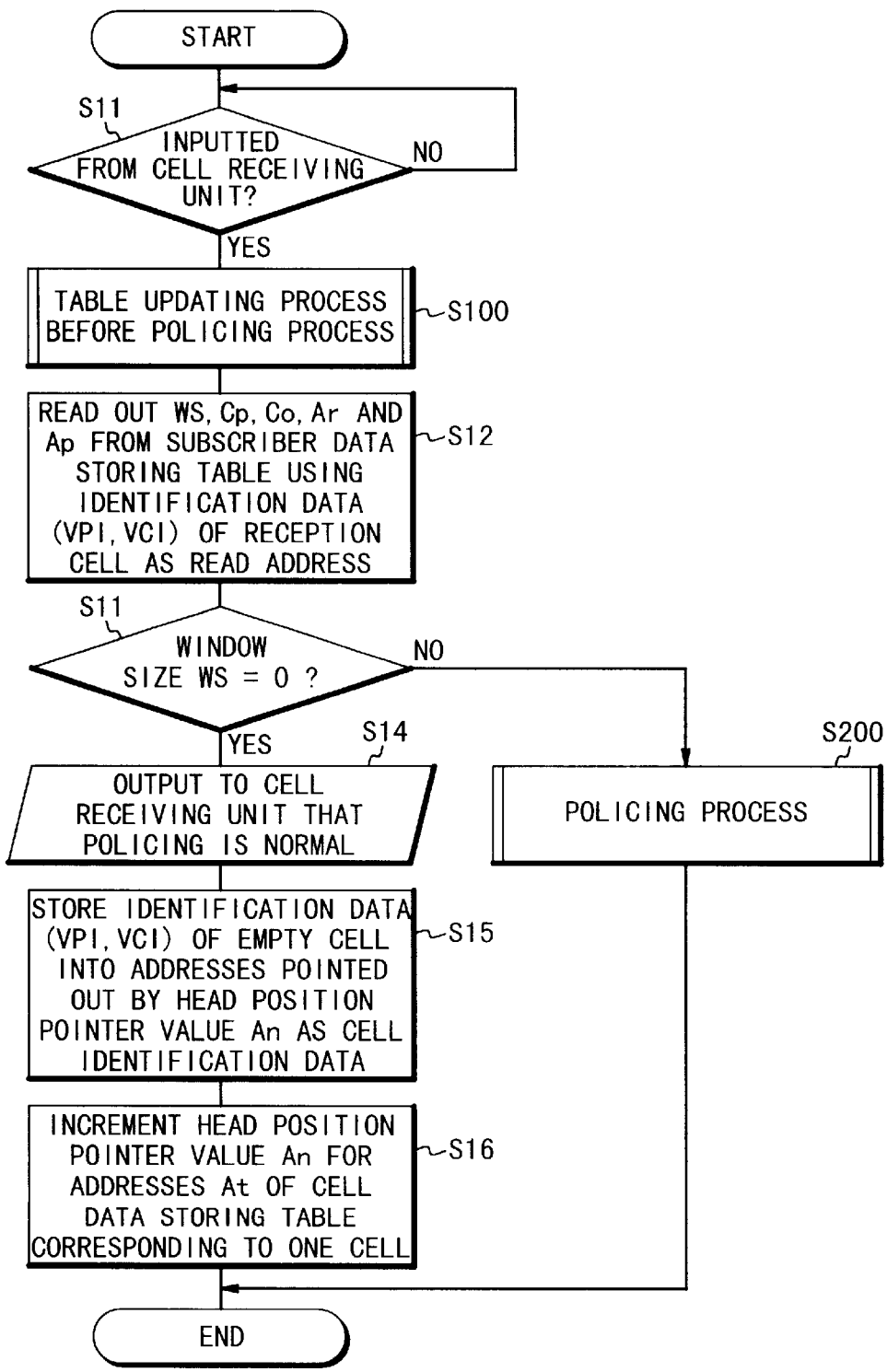
FIG. 13 is a flow chart illustrating an operation procedure of a control circuit of a control unit shown in FIG. 4.
Figure 14:
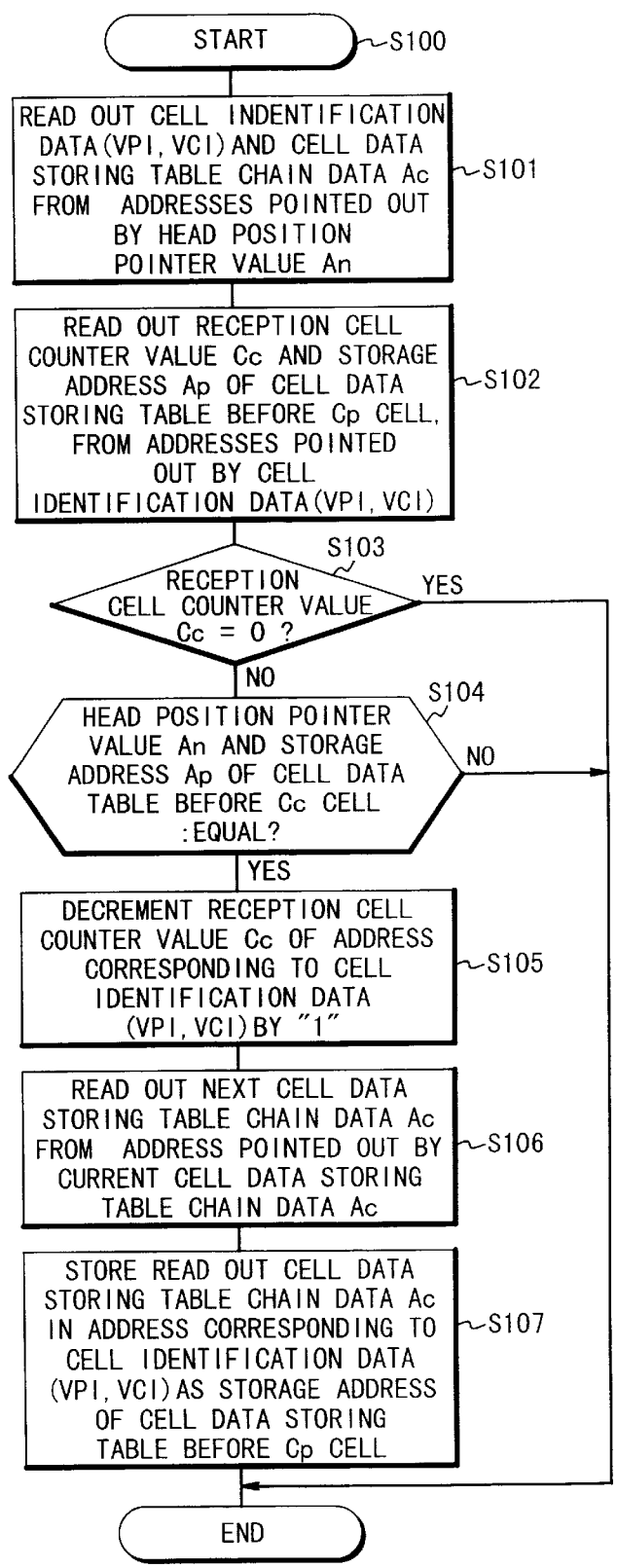
FIG. 14 is a flow chart illustrating the detail of the table updating process procedure before the policing determining process shown in FIG. 13.

On the other hand, the processing of the step S100 of FIG. 13 is a table updating process before the policing determining process by the control circuit 210, as shown in FIG. 14.

Referring to FIG. 14, in the first step S101, there are read out the cell identification data VPI and VCI of the reception ATM cell and the cell data storing table chain data Ac in the past reception ATM cell, which is stored in the head storage position of the storage address chain started from the storage address of the cell data storing table 410 pointed our with the head position pointer value An. Then, the control advances to a step S102.

In the step S102, the cell identification data VPI and VCI of the past reception ATM cell are read out as a read address. The reception cell counter value Cc and the storage address Ap to the cell data storing table before the Cp cell are read out from the subscriber data storing table 310 using the read address. Then, the control advances to a step S103.

In the step S103, it is determined whether or not the read reception cell counter value Cc is "0". In case of the reception cell counter value Cc=0, the table updating process becomes unnecessary and the control ends, because there is not any reception ATM cell in the past. On the other hand, in case of the reception cell counter Cc≠0, the, control advances to the next step S104, because the reception ATM cells in the past still exist.

In the step S104, it is determined whether or not the storage address Ap to the cell data storing table before the Cp cell read out in the step S102 is coincident with the head position pointer value An. In case that the storage address Ap to the cell data storing table before the Cp cell is coincident with the head pointer value An, it is necessary to save the storage address to the cell data storing table 410 before the Cp cell of the past reception ATM cell. This is because the storage content is overwritten with the data of the new reception ATM cell. Therefore, the control must go to the next step S105. On the contrary, in case that the storage address Ap to the cell data storing table before the Cp cell≠the head position pointer value An, the past reception ATM cell still exists but is not influenced by the new reception ATM cell. Therefore, the table updating process becomes unnecessary and the control ends.

Here, it would be strange that that the storage address Ap to the cell data storing table before the Cp cell≠the head position pointer An, because it is confirmed in the step S103 that the reception cell counter value Cc≠0. After becoming equal to the policing value Cp, the reception ATM cell counter value Cc is not updated even if a new STM cell is receive. The relation is maintained that the reception cell counter value Cc=the policing value Cp. In this case, the number of reception ATM cells which are stored in the cell data storing table 410 is larger than the reception ATM cell counter value Cc. Even if there are many reception ATM cells, which are stored in the cell data storing table 410, it becomes another story completely different from the policing problem, because it is not compared with the window size.

It should be noted that the reasons why the state of the reception cell counter value Cc=the policing value Cp is maintained are as follows.

Figure 3:
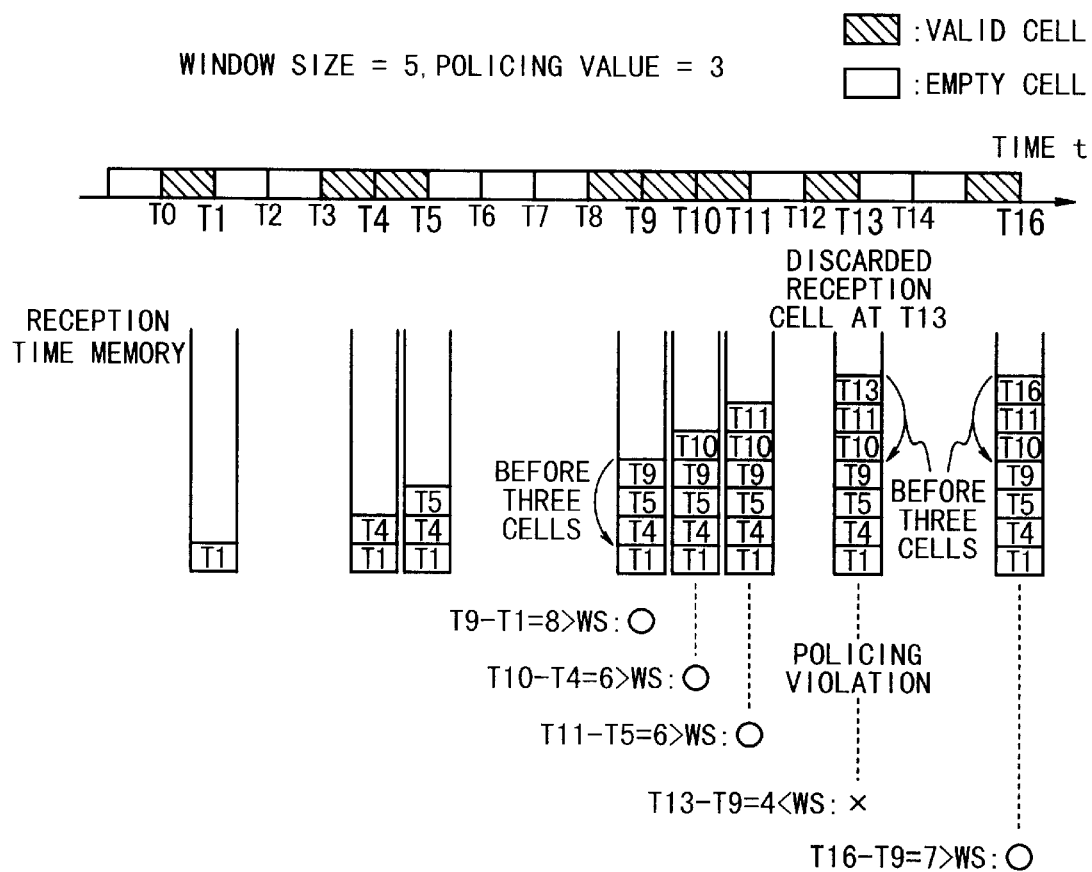
FIG. 3 is a diagram illustrating the policing of a cell in a conventional reception time comparing system.

The first reason is in that the reception cell counter value Cc is used to pause the determination of the policing violation until the reception cell counter value Cc=the policing value Cp. The second reason is in that there is no reason that the number of reception ATM cells must be correctly counted beyond the policing value Cp using the reception ATM cell counter value Cc. Also, another reason is in that an unnecessary problem should be avoided like the overflow of a counter in the reception time comparing method shown in FIG. 3.

The data itself on which overwrite is performed can not be saved. However, in order to save the time relation, after the content of the reception cell counter value Cc read out in the step S102 is decremented by "1" and then stored once more, the control advances to the next step S106.

In the step S106, because the reception cell counter value Cc is decremented by "1" in the step S105, the next cell data storing table chain data Ac is read out based on the address pointed out by the cell data storing table chain data Ac read out in the step S101. Thus, the storage address chain is made new, and then the control advances to the last step S107.

In the step S107, the content of the next cell data storing table chain data Ac read out in the step S106 is stored as the storage address Ap to the cell data storing table before the Cp cell in a storage address of the subscriber data storing table 310 corresponding to the cell identification data VPI and VCI of the past reception ATM cell, instead of the storage address Ap to the cell data storing table before the Cp cell which will be lost by the overwrite. Thus, the table updating process is ended.

The two possible cases could be considered as the situation of the overwritten ATM cell and the state of the tables. In the first case, the ATM cell is not received thereafter, so that the reception cell counter value Cc becomes "0".

In this case, because this state is the same state as the control returns to the initial state. Therefore, the same cell receiving process as the usual ATM cell is first received is performed.

In the second case where the ATM cell is received thereafter, so that the reception cell counter value Cc is recovered such that the reception cell counter value Cc=the policing value Cp. In this case, the usual policing determining process is performed to the reception ATM cell which has been received thereafter.

Figure 15A:
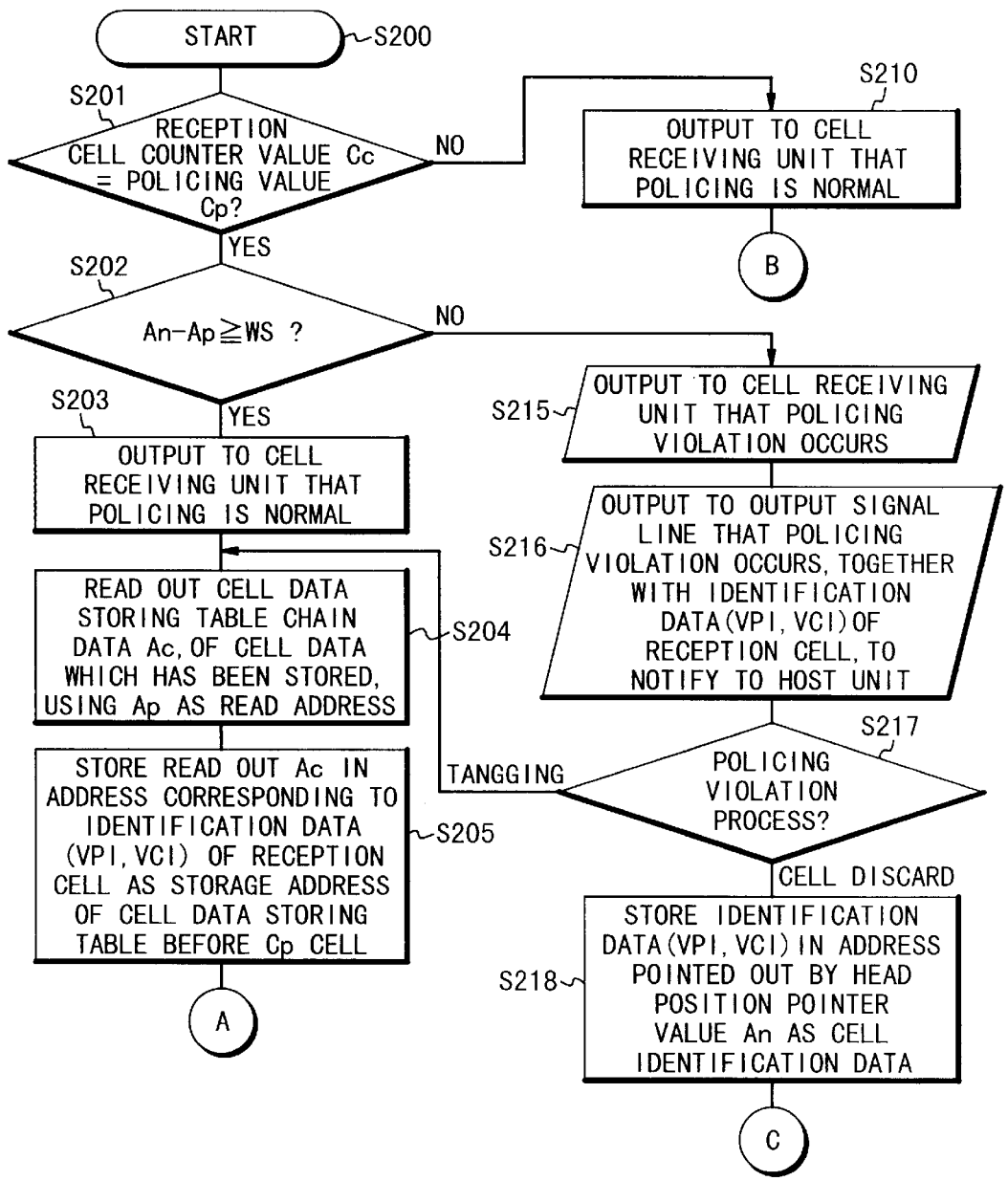
FIGS. 15A and 15B are flowcharts illustrating the details of the policing determining process shown in FIG. 13.
Figure 15B:
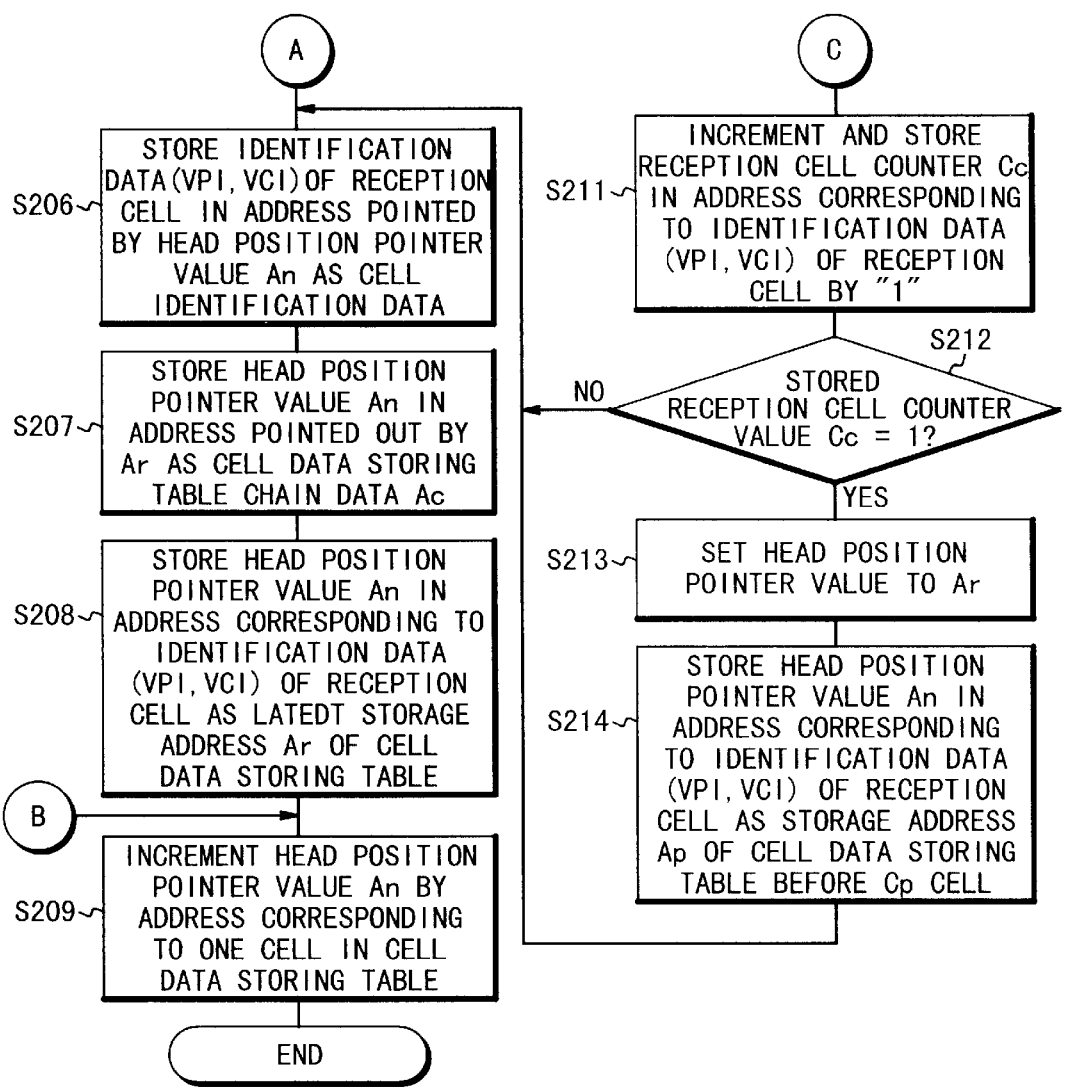

FIGS. 15A and 15B are flow charts of the policing determining process and the table updating process after the determination by the control circuit 210 in the step S200 of FIG. 13. In a step S201, It is determined whether or not the reception cell counter value Cc of the reception ATM cell read in the step S12 of FIG. 13 is the policing value Cp. In case that the reception cell counter value Cc is coincident with the policing value Cp, the control advances to a step S202, because this determination is the policing violation. Also, in case that the reception cell counter value Cc is not coincident with the policing value Cp, the control advances to a step S210 because the determination is not nay policing violation.

In the step S202, it is determined based on the window size WS, the storage address Ap to the cell data storing table before the Cp cell and the head position pointer value An in the reception ATM cell read out in the step S12 of FIG. 13 whether or not the policing violation exists. The determination of the policing violation is performed based on the conditional expression of An−Ap≧WS. The reception ATM cell is a normal cell with no policing violation when the condition is satisfied. Therefore, the control advances to a step S203. On the other hand, when the condition of An−Ap≧WS is not satisfied, the reception ATM cell is a cell with any policing violation. Therefore, the control advances to a step S215.

On the other hand, in the step S203, after a notice indicating that the reception ATM cell is the normal cell with no policing violation is outputted to the cell receiving unit 10, the control advances to a step S204. The step S204 and subsequent steps are for the table updating process after the policing determination.

First, the cell data storing table chain data Ac is read out from the cell data storing table 410 using, as a read address, the storage address Ap to the cell data storing table before the Cp cell corresponding to the reception ATM cell read in the step S12 of FIG. 13. Then, the control advances to a step S205.

In the step S205, the content of the cell data storing table chain data Ac read out in the step S204 is stored as the storage address Ap to the cell data storing table before the Cp cell in the storage address of the subscriber data storing table 310 corresponding to the cell identification data VPI and VCI of the reception ATM cell. Through this series of operations, the content of the storage address Ap to the cell data storing table before the Cp cell has the same content as the storage address chain of the cell data storing table 410 is moved into the direction of the new record for the reception ATM cell. Next, the control advances to a step S206.

In the step S206, the cell identification data VPI and VCI of the reception ATM cell are stored in the storage address of the cell data storing table 410 pointed out with the head position pointer value An. Then, the control advances to a step S207.

In the step S207, the content of the head position pointer An associated with the reception ATM cell read out in the step S12 of FIG. 13 is stored as the cell data storing table chain data Ac in the storage address of the cell data storing table 410 pointed out by the latest storage address Ar to the cell data storing table. In this processing, the storage address of the cell data storing table for the new reception ATM cell received in this time is stored in the latest storage address of the cell data storing table chain data Ac. No data could be written in the latest storage address of the cell data storing table chain data Ac, when the previous reception ATM cell is received. Thus, the storage address chain of the cell data storing table 410 is updated. Then, the control advances to step S208.

Also, in this step S208, the head position pointer value An is stored as the latest storage address Ar to the cell data storing table in a storage address of the subscriber data storing table 310 corresponding to the cell identification data VPI and VCI of the reception ATM cell such that the latest memory address of the reception ATM cell described in the step S207 is not forgotten. Then, the control advances to the last step S209.

In the step S209, the address amount corresponding to one ATM cell is added to the head position pointer value An of the cell data storing table 410 to update the head position pointer value An. Then, the control ends. The actual address amount At is the same as "1", in this embodiment.

The processing when the reception ATM cell is determined to have any policing violation is performed from the step S215 and the subsequent steps. After it is outputted to the cell receiving unit 10 that the reception ATM cell is the cell having the policing violation, the control advances to a step S216.

In this step S216, that fact that the policing violation is detected is outputted to the output signal line 4 together with the cell identification data VPI and VCI of the reception ATM cell. Thus, a notice is outputted to a host apparatus and then the control advances to a step S217.

In the step S217, the processing for the policing violation cell which is initially set to the policing apparatus 1 is selected. When a cell discarding process is set as the processing for the policing violation cell, the control advances to a step S218. When a tagging process is set to the processing for the policing violation cell, the control advances to a step S204.

In the step S218, the processing when the cell discarding process is set to the policing violation cell is performed. The cell identification data VPI and VCI of the empty cell are stored as the cell identification data in the storage address of the cell data storing table 410 pointed out with the head position pointer value An. Then, the control advances to a step S209.

Also, the step S210 is executed when the reception ATM cell is not dealt with as a cell with any policing violation. This corresponds to a case that a value of the reception cell counter value Cc still is too small. In this case, the reception ATM cell is outputted to the cell receiving unit 10 as a normal ATM cell with no policing violation. Then, the control advances to a step S211.

In the step S211, the reception cell counter value Cc is incremented by "1" of the subscriber data storing table 310 corresponding to the cell identification data VPI and VCI of the reception ATM cell, and stored in the original position. Then, the control advances to a step S212.

In the step S212, if the content of the reception cell counter value Cc incremented in the step S211 is "1", the control advances to the step S213, because the reception ATM cell is the first reception ATM cell. If the content of the reception cell counter value Cc is other than "1", the control advances to the step S206.

In the step S213, the first ATM cell reception processing is performed. The head position pointer value An is stored as the latest storage address Ar to the cell data storing table 410 in a storage address of the subscriber data storing table 310 corresponding to the cell identification data VPI and VCI of the reception ATM cell. Then, the control advances to a step S214.

In the step S214, the head position pointer value An is stored as the storage address Ap to the cell data storing table before the Cp cell in the storage address of the subscriber data storing table 310 corresponding to the cell identification data VPI and VCI of the reception ATM cell. Then, the control advances to the step S206. The storage address Ap to the cell data storing table before the Cp cell is initialized upon the first ATM cell reception. Thus, after the reception ATM cell counter value Cc is equal to the policing value Cp, the storage address chain is traced in the cell data storing table 410 based on the result of the policing determining process to extend the storage address chain into the temporally new direction, each time of a new ATM cell is received.

Figure 16:
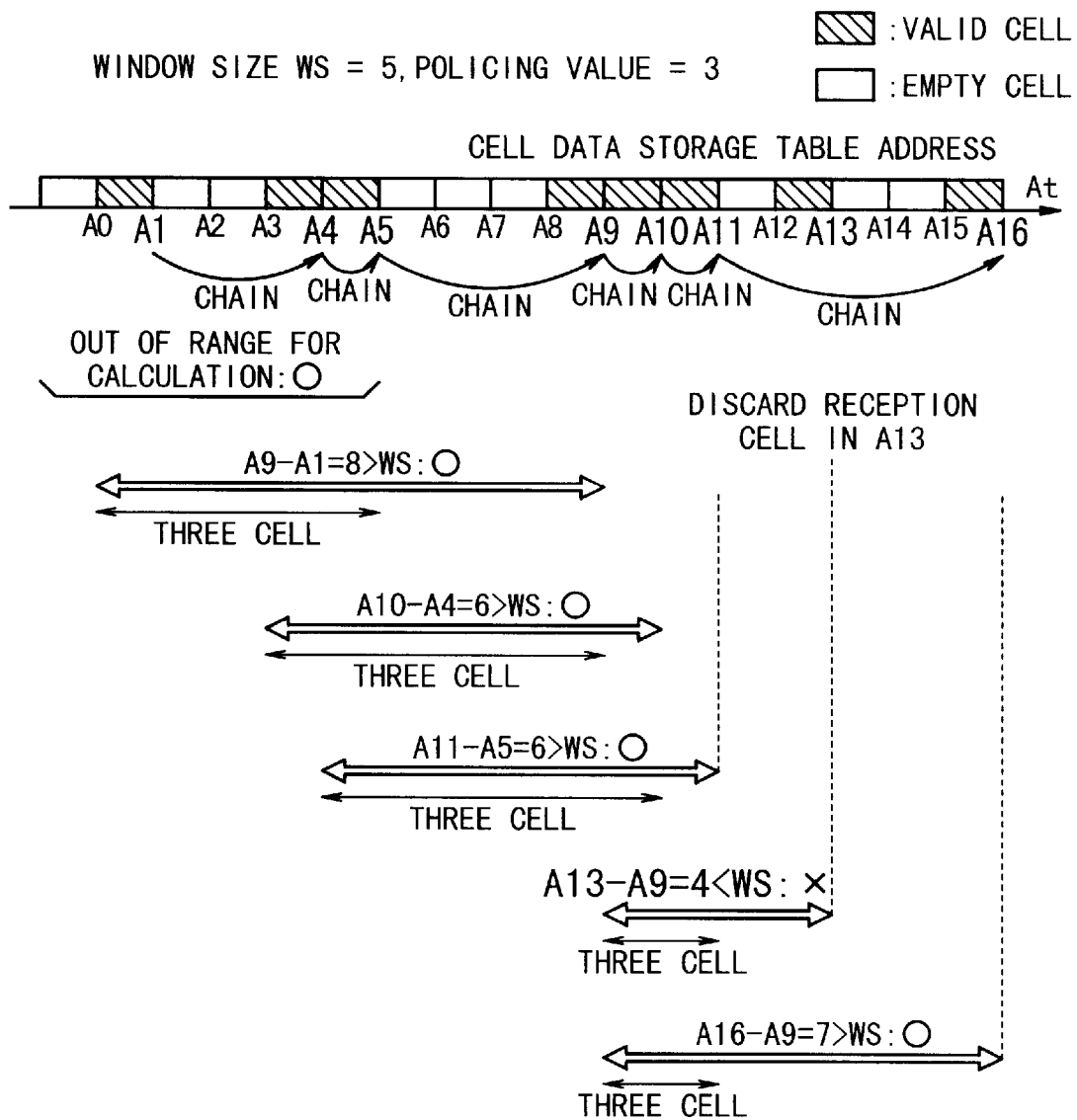
FIG. 16 is a diagram to explain the policing determining process in the first embodiment of the present invention.

The actual state of the policing determining process will be described with reference to the timing chart of FIG. 16. The example of FIG. 13 shows the case that the policing violation processing is a cell discarding process, the window size=5, the policing value=3. The state of the storage address chain of the reception ATM cell, and a relation between the reception ATM cell and the cell data storing table in case of the policing determining process are shown in addition to the policing determining process. In this example, the case is shown in which the ATM cell which is received for the storage address A13 is determined to have any policing violation so that the reception ATM cell is discarded. Also, for the convenience of the description, it is supposed that valid ATM cells of a single kind and empty cells are mixedly exist.

However, it should be noted that the cell data storing table is common to all the cells and each of the cells is managed independently from each other in units of cell identification data VPI and VCI in this embodiment, as described in detail with reference to the flow charts. Therefore, even when valid ATM cells of plural kinds are continuously received, the policing determining process for each of the received cells can be independently performed without interfering each other.

Figure 17:
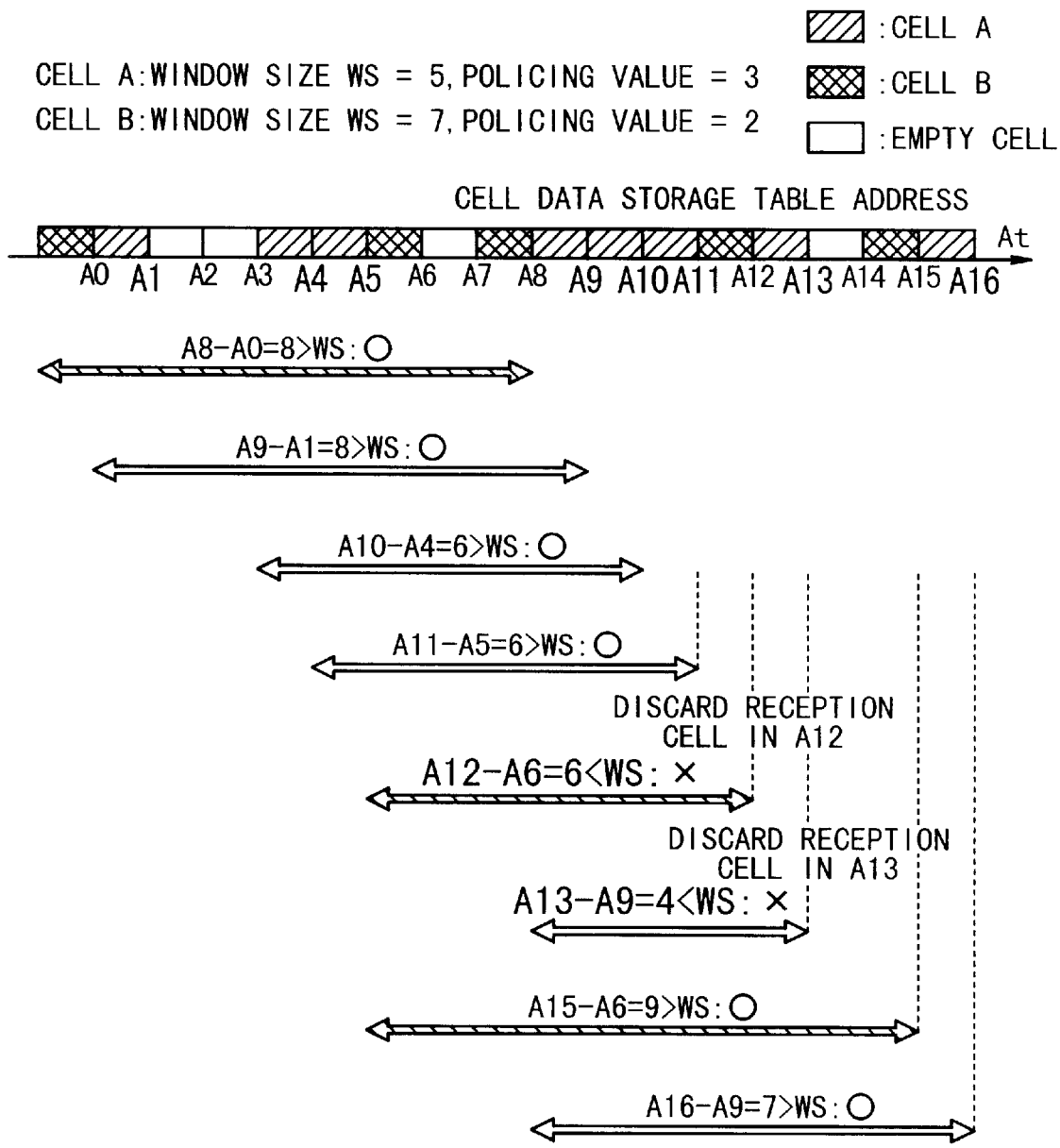
FIG. 17 is a diagram to explain a different policing determining process in the first embodiment of the present invention.

Also, FIG. 17 shows the state of the policing determining process for cells of plural kinds. In this example, the case that the policing determining process for two kinds of cells A and cells B will be described. As described above, the policing determining process is not influenced by the difference of the kind of the cell and the policing parameter of each cell. The policing parameter can be freely set independently for every cell identification data.

FIG. 18 shows the state when the policing violation processing is a tagging process. The condition other than the policing violation processing is the same as in the case of FIG. 16. This example shows that the influence to the policing determining process due to the difference of the policing violation processing very few.

FIG. 19 shows the subscriber data storing table 320 according to the second embodiment of the present invention. This table is used instead of the subscriber data storing table 310 of the subscriber data storing unit 30 in the policing apparatus 1 shown in FIG. 4. The other portions have the same structure as that of FIG. 4.

One feature of the policing determining process when the subscriber data storing table 320 is used is in that an average cell rate Ca in a storage section 316 is added to the subscriber data storing table 310 in the subscriber data storing table 320 so that the number of cells in the average window for every cell identification data VPI and VCI can be known. (Average cell rate Ca)=(WS×Cp)÷(An−Ap) The above equation indicates the number of cells in the average window. When the subscriber data storing table 320 is used, the control circuit 210 calculates the average cell rate Ca and storing it, each time the policing determining process is performed.

In case that the reception cell is determined to be not a policing violation cell, it becomes possible to know the average number of cells in the present actual window timely. Therefore, the average cell speed Ca can be used to know a margin to the policing value when necessary. Also, when the policing violation processing is the tagging process, the cell rate of the policing violation cell can be notified to the host apparatus. Thus, the degree of policing violation can be grasped.

FIG. 20 shows the subscriber data storing table 330 according to the third embodiment of the present invention. The different point of this table 330 from the other subscriber data storing tables is mainly in the structure. In the structure, there are provided storage sections 3111 and 3112 for window size WS1 and WS2, storage section 3121 and 3122 for policing values CP1 and CP2, storage sections 3131 and 3132 for reception cell counter values Cc1 and Cc2 and storage sections 3151 and 3152 for storage addresses Ap1 and Ap2 to the cell data storing table before Cp cells for two sets. A single latest storage address Ar to the cell data storing table is provided in common to the two sets.

Figure 21:
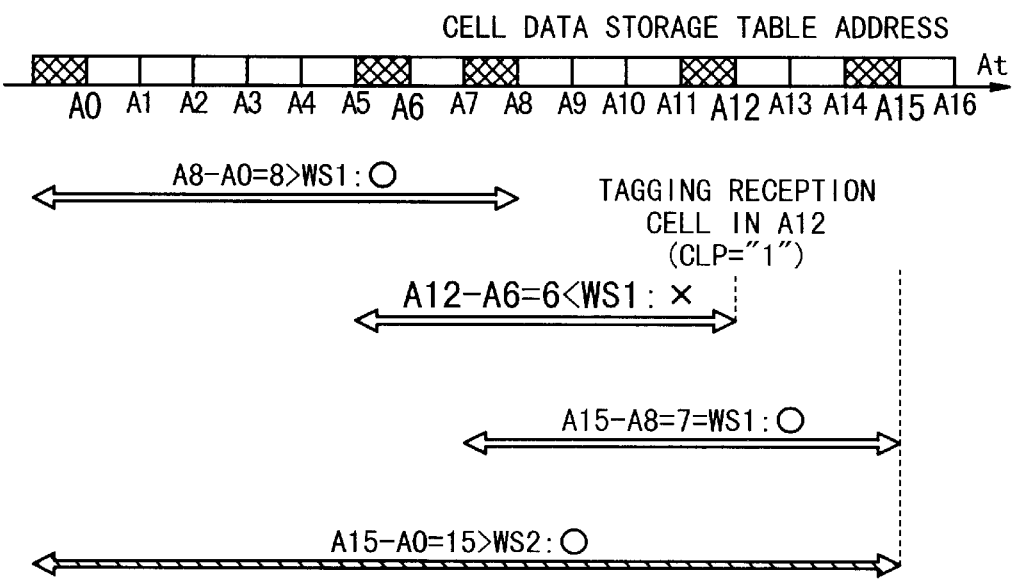
FIG. 21 is a diagram illustrating the policing determining process to a cell using one or more windows with different window sizes in the present invention.

When the subscriber data storing table 330 is used, the policing determination can be performed based on two independent policing parameters in units of the cell identification data VPI and VCI, as shown in the time chart of FIG. 21. Depending on the kind of cells, there is a case that a single policing parameter is sufficient. Also, there is a case that it is not necessary to perform the policing determination. In such a case, it is sufficient that one of the window sizes. WS1 and WS2 corresponding to the cell identification data VPI and VCI is previously set to "0".

When the subscriber data storing table 330 is used, the control circuit 210 performs the policing determination twice using different policing parameters for every cell identification data VPI and VCI each time the ATM cell is received. Therefore, the control circuit 210 becomes busy. However, because the numbers of times of access to the memory in the policing determination processing is originally few in the present invention, it is easy to perform the policing determination twice for every cell identification data VPI and VCI each time the ATM cell is received.

The performance of the policing determination twice using the two independent policing parameters for every cell identification data VPI and VCI has the following tendency, as shown in FIG. 21. That is, the policing determination when the window size is small tends to be performed based on the peak rate. On contrary, the policing determination when the window size is large tends to be performed based on the average rate.

Therefore, when the optimal policing parameter for every cell identification data VPI and VCI is unclear, this table becomes very effective. Also, it is generally very difficult that the user actually declares the policing parameter to use for the policing determination by the self. In such a case, different parameters are temporarily determined and are measured, as shown in FIG. 21, and the optimal policing parameters may be determined for every cell identification data VPI and VCI based on the measuring result.

FIG. 22 shows a subscriber data storing table 340 according to the fourth embodiment again of the present invention. In the subscriber data storing table 340, a policing processing data in a storage section 317 is added to the subscriber data storing table 310. Therefore, it is possible to select the policing violation processing for every cell identification data VPI and VCI. That is, the policing violation processing is not fixed based on the initial setting of the policing apparatus 1.

When the subscriber data storing table 340 is used, the control circuit 210 refers to the policing processing data in the storage section 317 for each time of the policing determining process. When the reception ATM cell is a policing violation cell, the control circuit 210 notify this fact to the host apparatus and the control circuit 210 also notifies the policing violation processing to the cell receiving unit 10. In the policing violation processing, the control circuit 210 performs the policing violation processing for every cell identification data VPI and VCI, i.e., the discarding process of the cell in case of the policing processing data=0, and the tagging process in case of the policing processing data=1. In the present invention, because there are few influences of the policing violation processing to the policing determining process, the policing violation processing may be switched in units of cell identification data VPI and VCI. Also, there is no mutual interference between the cell identification data VPI and VCI of the reception ATM cell.

In this way, in the present invention, the cell identification data VPI and VCI and the cell data storing table chain data Ac are stored in the cell data storing table 410 which is common to all the ATM cells one after another in the circulative manner in the state in which the reception order and the reception interval of all ATM cells are preserved.

Also, the storage address chain is generated independently for every cell identification data VPI and VCI of the reception ATM cells using the cell data storing table chain data Ac. Thus, at the time of the policing determining process, it needs only to refer only to the cell data storing table chain data Ac of the reception ATM cell and the management data of this cell, and it is not necessary to refer to data for the other cells.

More specifically, all the reception ATM cells are managed in the subscriber data storing table 310 for each cell identification data VPI and VCI. Every time the ATM cell is received, the determination of the policing violation is performed using the window size WS, the storage address Ap to the cell data storing table before the Cp cell and the head position pointer. After the determination of the policing violation, the storage address chain of the cell data storing table 410 is traced to update the cell data storing table chain data Ac of the cell data storing table 410. Also, only the latest storage address Ar to the cell data storing table and the data of storage address Ap to the cell data storing table before the Cp cell are updated in the subscriber data storing table 310. In other words, the reception ATM cell is stored in a common memory. However, the determination of the policing violation is performed by comparing storage addresses on the common memory to the reception ATM cell.

In case of $An-Ap \geq WS$, because Ap is farther in distance than WS, the number of reception ATM cells in the window is less than the policing value. As a result, the reception ATM cell is normal in the policing determination. In case of $An-Ap<WS$, because Ap is near than the WS, so that it is indicated that the ATM cells are already received for the policing value, the ATM cell is policing violation cell.

That is, in the present invention, the cell data of the reception ATM cells are stored in the cell data storing table 410 which is common to all the reception ATM cells without using a reception time storing memory dedicated to every cell identification data VPI and VCI and a time counter to specify a reception time. However, the number of times of access to the cell data storing table 410 in the policing determining process can be greatly decreased.

Also, in the present invention, there is not an overflow problem of the time counter, unlike the case of the reception time comparison method. Therefore, the temporal continuity of the reception ATM cells on the cell data storing table 410 can be completely guaranteed.

Further, in the present invention, the cell data of the past reception ATM cell which is overwritten and lost by the cell data of a new reception ATM cell is completely preserved to guarantee the temporal continuity. More specifically, the cell data of a past reception ATM cell stored in the storage address of the cell data storing table 410 pointed out with the head position pointer value An is checked before the policing determination. Then, the reception cell counter value Cc and the storage address Ap to the cell data storing table before the Cp cell are read out from the storage address of the subscriber data storing table 310 based on the stored cell identification data VPI and VCI. In the case of the reception cell counter value Cc is not equal to "0" and the storage address Ap to the cell data storing table before the Cp cell is equal to the head position pointer An, the reception cell counter value Cc is decremented and stored by "1". Moreover, the next cell data storing table chain data Ac is determined from the cell data storing table chain data Ac for past reception ATM cell to be stored as the storage address to the cell data storing table before the Cp cell. In this way, the time relation of the past reception ATM cells is completely preserved.

In addition, in the present invention, the window size and the policing value are possible to be freely and independently set for every cell identification data VPI and VCI. Also, no interference exists between the reception ATM cells. Therefore, the length of the cell data storing table 410 is set as a maximum and there is not limitation to the window size length and the magnitude of the policing value if these values are within the maximum. Also, there are no influence to the operation of the policing apparatus and the hardware quantity, even if the these values are set or changed within the maximum. Thus, the present invention has the feature of the small number of times of access to the memory as in the reception time comparing method, and the feature of the small hardware scale as in the conventional common memory using method. Therefore, the present invention is easily realized to practical use. Further, the present invention can flexibly cope with various measurement conditions, and the operation as the policing apparatus is easy.

What is claimed is:

1. A policing apparatus comprising:
a cell receiving unit for receiving received cells to temporarily store said received cells and for performing a policing violation process on each of said received cells as a reception cell based on a result of a policing violation determination of said reception cell;
a cell data storing section having a cell data storing table for circularly storing a cell identification data of said reception cell;
a subscriber data storing section having a subscriber data storing table for storing a management data for every cell identification data, wherein the management data is used for said policing violation determination; and
a control unit for:
referring to said subscriber data storing table based on said cell identification data of each said reception cell to read said management data,
performing said policing violation determination on said reception cell based on the read management data and an address pointer value for said reception cell,
outputting said result of said policing violation determination to said cell receiving unit, and
storing said cell identification data of said reception cell in said cell data storing table based on said address pointer value.

2. A policing apparatus according to claim 1, wherein said subscriber data storing table includes a window size as a part of said management data, and
wherein said control unit performs said policing violation determination based on a reference cell address, said window size and said address pointer value, said reference cell address indicating an address of said cell data storing table in which said cell identification data of a reference reception cell is stored.

3. A policing apparatus according to claim 1, wherein said subscriber data storing table stores another management data, and
said control unit:
refers to said subscriber data storing table based on said cell identification data of said reception cell each time said reception cell is received to read said management data and said other management data,
performs said policing violation determination to said reception cell based on said management data, said other management data and an address pointer value for said reception cell, outputs said result of said policing violation determination to said cell receiving unit, and stores said cell identification data of said reception cell in said cell data storing table based on said address pointer value.

4. A policing apparatus according to claim 2, wherein said subscriber data storing table includes said reference cell address in addition to said window size as a part of said management data.

5. A policing apparatus according to claim 2, wherein said control unit determines that said reception cell is a normal cell, without performing said policing violation determination, when a number of reception cells having the same cell identification data is smaller than a policing value.

6. A policing apparatus according to claim 2, wherein said subscriber data storing table stores an average cell rate data indicating a number of reception cells in an average window, and said control unit updates said average cell rate data each time said reception cell is received.

7. A policing apparatus according to claim 2, wherein said subscriber data storing table stores a policing violation processing data, and said control unit performs a process designated by said policing violation processing data to said reception cell when said reception cell is determined to be a policing violation cell.

8. A policing apparatus comprising:

a cell receiving unit for receiving received cells to temporarily store said received cells and for performing a policing violation process on each of said received cells as a reception cell based on a result of a policing violation determination of said reception cell;

a cell data storing section having a cell data storing table for circularly storing a cell identification data of said reception cell;

a subscriber data storing section having a subscriber data storing table for storing a management data for every cell identification data, wherein the management data is used for said policing violation determination; and a control unit for:

referring to said subscriber data storing table based on said cell identification data of each said reception cell to read said management data, performing said policing violation determination to said reception cell based on the read management data and an address pointer value for said reception cell, outputting said result of said policing violation determination to said cell receiving unit, and storing said cell identification data of said reception cell in said cell data storing table based on said address pointer value, wherein said subscriber data storing table includes a window size as a part of said management data, and wherein said control unit performs said policing violation determination based on a reference cell address, said window size and said address pointer value, said reference cell address indicating an address of said cell data storing table in which said cell identification data of a reference reception cell is stored, wherein said control unit determines that said reception cell is a policing violation cell if a circulative address difference between said address pointer value and said reference cell address is smaller than said window size, and wherein said control unit determines that said reception cell is a normal cell if the circulative address difference between said address pointer value and said reference cell address is equal to or larger than said window size.

9. A policing apparatus according to claims, wherein said control unit updates said reference cell address to an address of said cell data storing table in which said cell identification data of a next reception cell to said reference reception cell having the same cell identification data is stored, when said reception cell is determined to be a normal cell.

10. A policing apparatus according to claim 8, wherein said control unit holds said reference cell address without updating of said reference cell address, when said reception cell is determined to be a policing violation cell.

11. A policing apparatus comprising:

a cell receiving unit for receiving received cells to temporarily store said received cells and for performing a policing violation process on each of said received cells as a reception cell based on a result of a policing violation determination of said reception cell;

a cell data storing section having a cell data storing table for circularly storing a cell identification data of said reception cell;

a subscriber data storing section having a subscriber data storing table for storing a management data for every cell identification data, wherein the management data is used for said policing violation determination; and a control unit for:

referring to said subscriber data storing table based on said cell identification data of each said reception cell to read said management data, performing said policing violation determination to said reception cell based on the read management data and an address pointer value for said reception cell, outputting said result of said policing violation determination to said cell receiving unit, and storing said cell identification data of said reception cell in said cell data storing table based on said address pointer value, wherein said subscriber data storing table includes a window size as a part of said management data, and wherein said control unit performs said policing violation determination based on a reference cell address, said window size and said address pointer value, said reference cell address indicating an address of said cell data storing table in which said cell identification data of a reference reception cell is stored, and wherein said cell data storing table stores a chain data in addition to said cell identification data to form a chain of said reception cells having the same cell identification data.

12. A policing apparatus according to claim 11, wherein said control unit stores as said chain data, for an immediately previous reception cell to a current reception cell having the same cell identification data, an address of said cell data storing table in which said cell identification data of said current reception cell is stored, when said current reception cell is received by said cell receiving unit.

13. A policing apparatus according to claim 12, wherein said control unit selectively updates said reference cell address to an address of said cell data storing table in which said cell identification data of a next reception cell to said reference reception cell having the same cell identification data is stored, using said chain data of said reference reception cell, in accordance with the result of said policing violation determination.

14. A policing method comprising the steps of:
receiving a reception cell to temporarily store said reception cell;
referring to a subscriber data storing table based on a cell identification data of said reception cell in response to the receiving of said reception cell to read a management data for every cell identification data, the subscriber data storing table storing the management data necessary for a policing violation determination;
performing said policing violation determination to said reception cell based on the read management data and an address pointer value for said reception cell;
circulatively storing said cell identification data of said reception cell in a cell data storing table based on said address pointer value; and
performing a policing violation process to said reception cell based on the result of policing violation determination to said reception cell.

15. A policing method according to claim 14, wherein said subscriber data storing table includes a window size as a part of said management data, and
wherein said step of performing said policing violation determination includes performing said policing violation determination based on a reference cell address, said window size and said address pointer value, said reference cell address indicating an address of said cell data storing table in which said cell identification data of a reference reception cell is stored.

16. A policing method according to claim 14, wherein said subscriber data storing table stores another management data, and
wherein said step of performing a policing violation determination includes:
referring to said subscriber data storing table based; on said cell identification data of said reception cell each time said reception cell is received to read out said management data and said other management data; and
performing said policing violation determination to said reception cell based on said management data, said other management data and an address pointer value for said reception cell.

17. A policing method according to claim 15, wherein said subscriber data storing table includes said reference cell address in addition to said window size as a part of said management data.

18. A policing method according to claim 15, wherein said step of performing said policing violation determination includes determining that said reception cell is a normal cell, without performing said policing violation determination, when a number of reception cells having the same cell identification data is smaller than a policing value.

19. A policing method according to claim 15, wherein said subscriber data storing table stores an average cell rate data indicating a number of reception cells in an average window, and
wherein said policing method further comprises the step of updating said average cell rate data each time said reception cell is received.

20. A policing method according to claim 15, wherein said subscriber data storing table stores a policing violation processing data, and
wherein said policing method further comprises the step of updating includes performing a process designated by said policing violation processing data to said reception cell when said reception cell is determined to be a policing violation cell.

21. A policing method comprising the steps of:
receiving a reception cell to temporarily store said reception cell;
referring to a subscriber data storing table based on a cell identification data of said reception cell in response to the receiving of said reception cell to read a management data for every cell identification data, the subscriber data storing table storing the management data necessary for a policing violation determination;
performing said policing violation determination to said reception cell based on the read management data and an address pointer value for said reception cell;
circulatively storing said cell identification data of said reception cell in a cell data storing table based on said address pointer value; and
performing a policing violation process to said reception cell based on the result of policing violation determination to said reception cell,
wherein said subscriber data storing table includes a window size as a part of said management data, and
wherein said step of performing said policing violation determination includes performing said policing violation determination based on a reference cell address, said window size and said address pointer value, said reference cell address indicating an address of said cell data storing table in which said cell identification data storing table in which said cell identification data of a reference reception cell is stored,
wherein said step of performing said policing violation determination includes:
determining that said reception cell is a policing violation cell if a circulative address difference between said address pointer value and said reference cell address is smaller than said window size, and
determining that said reception cell is a normal cell if the circulative address difference between said address pointer value and said reference cell address is equal to or larger than said window size.

22. A policing method according to claim 21, wherein said step of performing said policing violation determination includes:
updating said reference cell address to an address of said cell data storing table in which said cell identification data of a next reception call to said reference reception cell having the same cell identification data is stored, when said reception cell is said normal cell; and
holding said reference cell address without updating of said reference cell address, when said reception cell is said policing violation cell.

23. A policing method comprising the steps of:
receiving a reception cell to temporarily store said reception cell;
referring to a subscriber data storing table based on a cell identification data of said reception cell in response to the receiving of said reception cell to read a management data for every cell identification data, the subscriber data storing table storing the management data necessary for a policing violation determination;
performing said policing violation determination to said reception cell based on the read management data and an address pointer value for said reception cell;
circulatively storing said cell identification data of said reception cell in a cell data storing table based on said address pointer value; and performing a policing violation process to said reception cell based on the result of policing violation determination to said reception cell, wherein said subscriber data storing table includes a window size as a part of said management data, and wherein said step of performing said policing violation determination includes performing said policing violation determination based on a reference cell address, said window size and said address pointer value, said reference cell address indicating an address of said cell data storing table in which said cell identification data storing table in which said cell identification data of a reference reception cell is stored, and wherein said cell data storing table stores a chain data in addition to said cell identification data to form a chain of said reception cells having the same cell identification data.

24. A policing method according to claim 23, wherein said receiving step includes storing as said chain data, for an immediately previous reception cell to a current reception cell having the same cell identification data, an address of said cell data storing table in which said cell identification data of said current reception cell is stored, when said current reception cell is received.

25. A policing method according to claim 24, wherein said step of performing said policing violation determination includes selectively updating said reference cell address to an address of said cell data storing table in which said cell identification data of a next reception cell to said, reference reception cell having the same cell identification data is stored, using said chain data of said reference reception cell, in accordance with the result of said policing violation determination.

* * * * *